United States Patent
Ochiai

(10) Patent No.: US 9,652,794 B2
(45) Date of Patent: May 16, 2017

(54) SERVER APPARATUS, PRODUCT GROUPING METHOD, PRODUCT GROUPING PROGRAM, RECORDING MEDIUM WITH COMPUTER-READABLE PRODUCT GROUPING PROGRAM RECORDED THEREON AND PRODUCT GROUPING SYSTEM

(75) Inventor: Yukiko Ochiai, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 687 days.

(21) Appl. No.: 13/517,400

(22) PCT Filed: Mar. 30, 2011

(86) PCT No.: PCT/JP2011/058111
§ 371 (c)(1),
(2), (4) Date: Jun. 20, 2012

(87) PCT Pub. No.: WO2011/125787
PCT Pub. Date: Oct. 13, 2011

(65) Prior Publication Data
US 2012/0259684 A1    Oct. 11, 2012

(30) Foreign Application Priority Data

Mar. 31, 2010 (JP) .................................. 2010-081992
Mar. 31, 2010 (JP) .................................. 2010-081995

(51) Int. Cl.
*G06Q 30/06* (2012.01)
*G06Q 30/08* (2012.01)

(52) U.S. Cl.
CPC ................................. *G06Q 30/0603* (2013.01)

(58) Field of Classification Search
CPC .............................. G06Q 30/06; G06Q 30/08
USPC ................................................ 705/26.1, 27.1
See application file for complete search history.

(56) References Cited

U.S. PATENT DOCUMENTS

| | | |
|---|---|---|
| 2004/0254839 A1 | 12/2004 | Nishimura |
| 2005/0086117 A1* | 4/2005 | Kanisawa et al. ............. 705/26 |
| 2007/0260529 A1 | 11/2007 | Furuno |
| 2009/0265240 A1 | 10/2009 | Ikeda et al. |
| 2011/0184831 A1* | 7/2011 | Dalgleish ..................... 705/26.7 |

FOREIGN PATENT DOCUMENTS

| | | |
|---|---|---|
| CN | 101064036 A | 10/2007 |
| JP | 10-162062 A | 6/1998 |
| JP | H10240815 A | 9/1998 |

(Continued)

OTHER PUBLICATIONS

E-Commerce the Japanese Way: Ubiquitous Convenience Stores Branch Into Cyberspace Online Convenience Small Japanese Stores Branch Into Cyberspace, Strom, Stephanie.New York Times (1923-Current file) [New York, N.Y] Mar. 18, 2000: C1., downloaded from ProQuestDirect on the Internet on Dec. 20, 2014, 2 pages.*

*Primary Examiner* — James Zurita
(74) *Attorney, Agent, or Firm* — Sughrue Mion, PLLC

(57) ABSTRACT

An orderer groups a plurality of order scheduled products which the orderer wishes to purchase.
A plurality of order scheduled products selected by a user are grouped by referring to a product group storing means that stores a correspondence between a product group and a plurality of products belonging to this product group.

24 Claims, 21 Drawing Sheets

(56) References Cited

FOREIGN PATENT DOCUMENTS

| | | | |
|---|---|---|---|
| JP | 2001-306958 | A | 11/2001 |
| JP | 2002-063489 | A | 2/2002 |
| JP | 2002-236694 | A | 8/2002 |
| JP | 2004-021659 | A | 1/2004 |
| JP | 2007-004615 | A | 1/2007 |
| JP | 2007172135 | A | 7/2007 |
| JP | 4035508 | B2 | 1/2008 |
| JP | 2008165505 | A | 7/2008 |
| JP | 2010-237773 | A | 10/2010 |
| KR | 100486173 | B | 4/2005 |

* cited by examiner

FIG. 4

| PRODUCT | GROUP NAME | | | | | | |
|---|---|---|---|---|---|---|---|
| | SUKIYAKI | BREAKFAST | MIDNIGHT SNACK | BARBECUE | TRAVEL | SIMMERED MEAT AND POTATOES | CURRY |
| BEEF | O | | | O | | | |
| CHINESE CABBAGE | O | | | | | | |
| JAPANESE LEEK | O | | | | | | |
| SHIRATAKI | O | | | | | O | |
| TOFU | O | | | | | | |
| GARLAND CHRYSANTHEMUM | O | | | | | | |
| ONION | O | | | O | | O | O |
| SANDWICH LOAF | | O | | | | | |
| TOMATO SAUCE | | O | | | | | |
| EGG | | O | | | | | |
| TOMATO | | O | | | | | |
| LETTUCE | | O | | | | | |
| YOGURT | | O | | | | | |
| JAM | | O | | | | | |
| CUP NOODLE | | | O | | | | |
| FROZEN ROASTED RICE BALL | | | O | | | | |
| COFFEE | | | O | | | | |
| COCOA | | | O | | | | |
| GREEN PEPPER | | | | O | | | |
| EGGPLANT | | | | O | | | |
| BEER | | | | O | | | |
| COAL | | | | O | | | |
| UNDERWEAR | | | | | O | | |
| SOCKS | | | | | O | | |
| RICE CRACKER | | | | | O | | |
| SHAMPOO | | | | | O | | |
| PORK | | | | | | O | O |
| POTATO | | | | | | O | O |
| CARROT | | | | | | O | O |
| CURRY BLOCK | | | | | | | O |
| PICKLED SHALLOT | | | | | | | O |

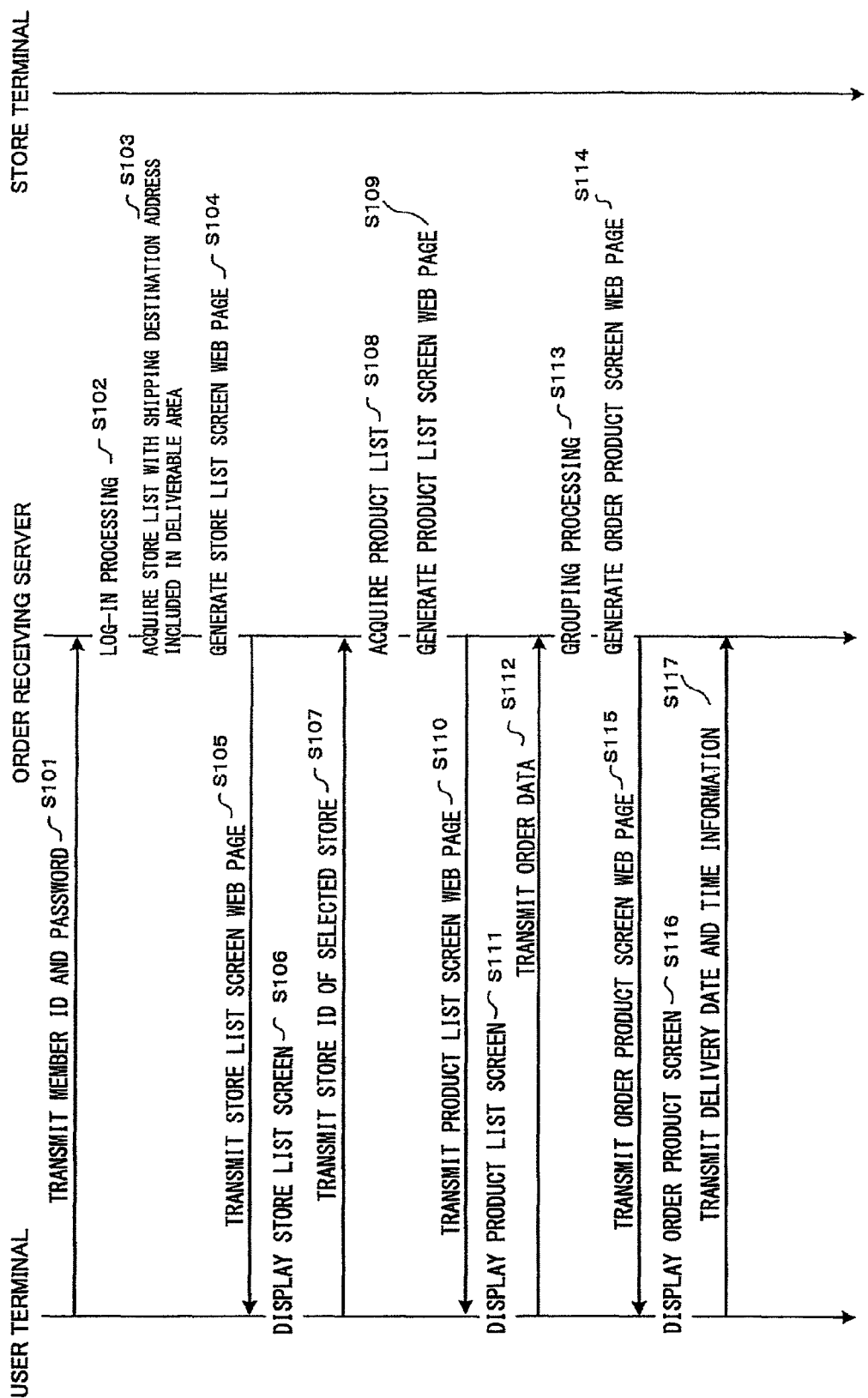

FIG. 6

| GROUP | PRODUCT NAME | | STANDARD | QUANTITY | AMOUNT OF MONEY |
|---|---|---|---|---|---|
| 1 [C] | BEEF | [C] | XXXXXXXXXXXXXXXXX | 1 | XXXyen |
| | ONION | [C] | XXXXXXXXXXXXXXXXX | 1 | XXXyen |
| | GREEN PEPPER | [C] | XXXXXXXXXXXXXXXXX | 1 | XXXyen |
| | EGGPLANT | [C] | XXXXXXXXXXXXXXXXX | 1 | XXXyen |
| | BEER | [C] | XXXXXXXXXXXXXXXXX | 1 | XXXyen |
| | COAL | [C] | XXXXXXXXXXXXXXXXX | 1 | XXXyen |
| 2 [C] | PORK | [C] | XXXXXXXXXXXXXXXXX | 1 | XXXyen |
| | POTATO | [C] | XXXXXXXXXXXXXXXXX | 1 | XXXyen |
| | CARROT | [C] | XXXXXXXXXXXXXXXXX | 1 | XXXyen |
| | SHIRATAKI | [C] | XXXXXXXXXXXXXXXXX | 1 | XXXyen |
| 3 [C] | SANDWICH LOAF | [C] | XXXXXXXXXXXXXXXXX | 1 | XXXyen |
| | EGG | [C] | XXXXXXXXXXXXXXXXX | 1 | XXXyen |
| | YOGURT | [C] | XXXXXXXXXXXXXXXXX | 1 | XXXyen |
| 4 [C] | RICE CRACKER | [C] | XXXXXXXXXXXXXXXXX | 1 | XXXyen |
| | SHAMPOO | [C] | XXXXXXXXXXXXXXXXX | 1 | XXXyen |
| × | BALLPOINT PEN | [C] | XXXXXXXXXXXXXXXXX | 1 | XXXyen |
| | PICKLED SHALLOT | [C] | XXXXXXXXXXXXXXXXX | 1 | XXXyen |

ORDERED PRODUCTS

| | |
|---|---|
| SUM OF PRODUCTS | XXXXyen |
| SHIPPING FEE | XXXyen |
| TOTAL SUM | XXXXyen |

YOU MAY CANCEL PRODUCT IN GROUP UNITS.

PLEASE SPECIFY DELIVERY DATE AND TIME.

[HEISEI XX YEAR ▼] [XX MONTH ▼] [XX DAY ▼]   [XX:XX~XX:XX ▼]

[NEXT (PAYMENT METHOD SELECTION)]

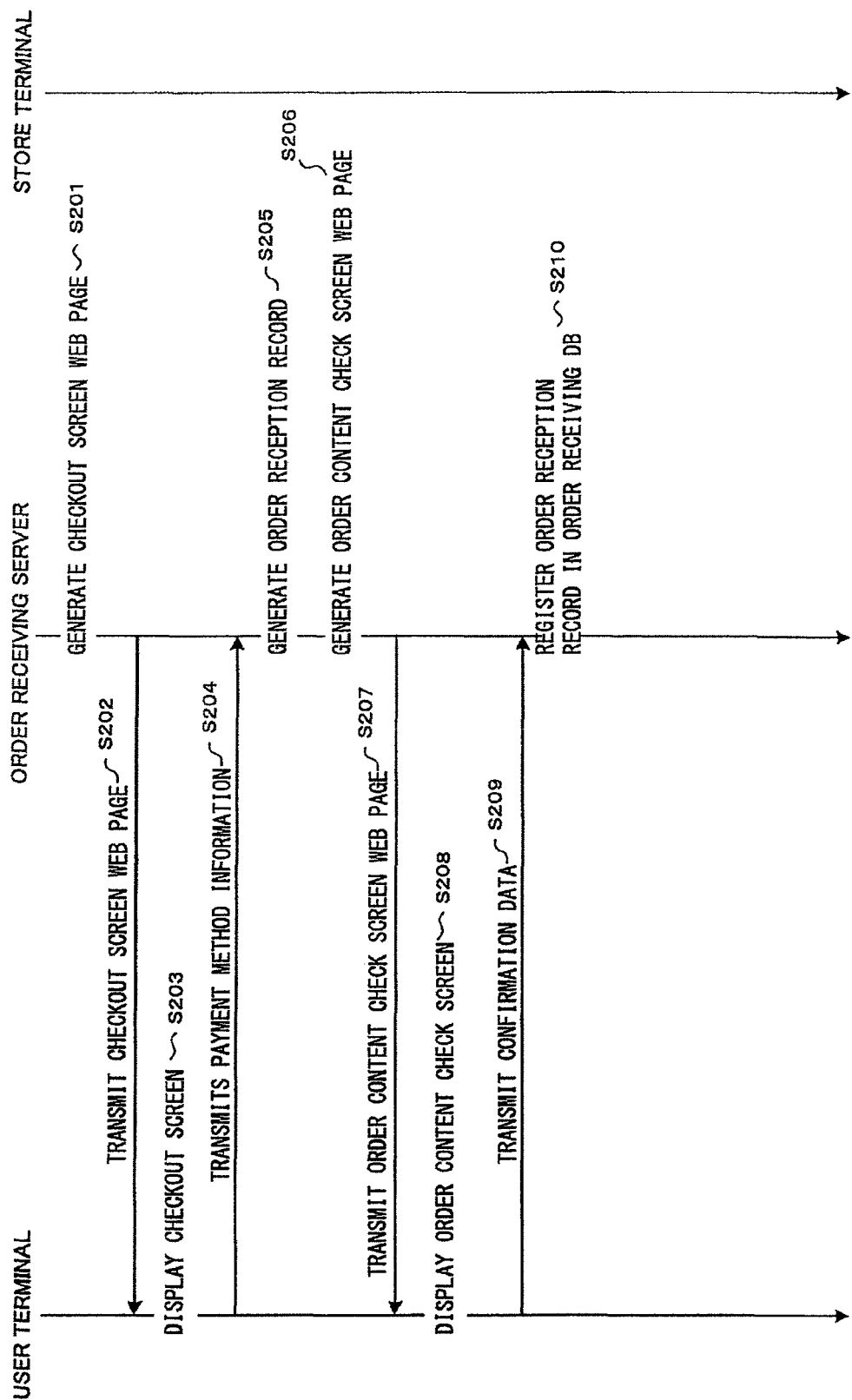

FIG. 10

| ORDER PRODUCT | GROUP NAME | | | | | | |
|---|---|---|---|---|---|---|---|
| | SUKIYAKI | BREAKFAST | MIDNIGHT SNACK | BARBECUE | TRAVEL | SIMMERED MEAT AND POTATOES | CURRY |
| BEEF | O | | | O | | | |
| ONION | O | | | O | | O | O |
| SANDWICH LOAF | | O | | | | | |
| EGG | | O | | | | | |
| YOGURT | | O | | | | | |
| GREEN PEPPER | | | | O | | | |
| EGGPLANT | | | | O | | | |
| RICE CRACKER | | | | | O | | |
| SHAMPOO | | | | | O | | |
| PORK | | | | | | O | O |
| POTATO | | | | | | O | O |
| CARROT | | | | | | O | O |
| BEER | | | | O | | | |
| SHIRATAKI | O | | | | | O | |
| PICKLED SHALLOT | | | | | | | O |
| COAL | | | | O | | | |
| BALLPOINT PEN | | | | | | | |
| COUNTER | 3 | 3 | 0 | 6 | 2 | 5 | 5 |

FIG. 11

| ORDER PRODUCT | SUKIYAKI | BREAKFAST | MIDNIGHT SNACK | BARBECUE | TRAVEL | SIMMERED MEAT AND POTATOES | CURRY | GROUP |
|---|---|---|---|---|---|---|---|---|
| BALLPOINT PEN | | | | | | | | × — 329 |
| BEEF | ○ | | | ○ | | | | |
| ONION | ○ | | | ○ | | ○ | ○ | |
| GREEN PEPPER | | | | ○ | | | | 1 — 321 |
| EGGPLANT | | | | ○ | | | | |
| BEER | | | | ○ | | | | |
| COAL | | | | ○ | | | | |
| SANDWICH LOAF | | ○ | | | | | | |
| EGG | | ○ | | | | | | |
| YOGURT | | ○ | | | | | | |
| RICE CRACKER | | | | | ○ | | | |
| SHAMPOO | | | | | ○ | | | |
| PORK | | | | | | ○ | ○ | |
| POTATO | | | | | | ○ | ○ | |
| CARROT | | | | | | ○ | ○ | |
| SHIRATAKI | ○ | | | | | ○ | | |
| PICKLED SHALLOT | | | | | | | ○ | |
| COUNTER | 1 | 3 | 0 | 0 | 2 | 4 | 4 | |

320 = rows BEEF–COAL group; 310 = rows SANDWICH LOAF–PICKLED SHALLOT; 390 = COUNTER; 325

FIG. 12

| ORDER PRODUCT | GROUP NAME | | | | | | | GROUP |
| --- | --- | --- | --- | --- | --- | --- | --- | --- |
| | SUKIYAKI | BREAKFAST | MIDNIGHT SNACK | BARBECUE | TRAVEL | SIMMERED MEAT AND POTATOES | CURRY | |
| BALLPOINT PEN | | | | | | | | × — 329 |
| BEEF | O | | | O | | | | 1 — 321 |
| ONION | O | | | O | | O | O | |
| GREEN PEPPER | | | | O | | | | |
| EGGPLANT | | | | O | | | | |
| BEER | | | | O | | | | |
| COAL | | | | O | | | | |
| PORK | | | | | | O | O | 2 — 321 |
| POTATO | | | | | | O | O | |
| CARROT | | | | | | O | O | |
| SHIRATAKI | O | | | | | O | | |
| SANDWICH LOAF | | O | | | | | | |
| EGG | | O | | | | | | |
| YOGURT | | O | | | | | | |
| RICE CRACKER | | | | | O | | | |
| SHAMPOO | | | | | O | | | |
| PICKLED SHALLOT | | | | | | | O | |
| COUNTER | 0 | 3 | 0 | 0 | 2 | 0 | 1 | |

320 (BEEF through SHIRATAKI)
310 (SANDWICH LOAF through PICKLED SHALLOT)
390 (COUNTER)
325 (arrow)

FIG. 13

| ORDER PRODUCT | GROUP NAME | | | | | | | GROUP | |
| --- | --- | --- | --- | --- | --- | --- | --- | --- | --- |
| | SUKIYAKI | BREAKFAST | MIDNIGHT SNACK | BARBECUE | TRAVEL | SIMMERED MEAT AND POTATOES | CURRY | | |
| BALLPOINT PEN | | | | | | | | × | 329 |
| BEEF | O | | | O | | | | 1 | 321 |
| ONION | O | | | O | | O | O | | |
| GREEN PEPPER | | | | O | | | | | |
| EGGPLANT | | | | O | | | | | |
| BEER | | | | O | | | | | |
| COAL | | | | O | | | | | |
| PORK | | | | | | O | O | 2 | 321 |
| POTATO | | | | | | O | O | | |
| CARROT | | | | | | O | O | | |
| SHIRATAKI | O | | | | | | O | | |
| SANDWICH LOAF | | O | | | | | | 3 | 321 |
| EGG | | O | | | | | | | |
| YOGURT | | O | | | | | | | |
| RICE CRACKER | | | | | O | | | 4 | 321 |
| SHAMPOO | | | | | O | | | | |
| PICKLED SHALLOT | | | | | | | O | × | 329 |
| COUNTER | 0 | 0 | 0 | 0 | 0 | 0 | 1 | | |

320 (brace covering product rows)
390 → COUNTER
325 ↑

FIG. 15

```
┌─────────────────────────────────────────────────────────────────────┐
│ TRANSMISSION SOURCE:xxxx@xxxx.co.jp                                 │
├─────────────────────────────────────────────────────────────────────┤  ⎫
│ TRANSMISSION DATE AND TIME:XX (MONTH) XX (DAY) XX:XX                │  ⎬ 510
├─────────────────────────────────────────────────────────────────────┤  ⎭
│ TITLE: OUT-OF-STOCK PRODUCT INFORMATION NOTICE                      │  ⎫
│                                                                     │  │
│ PORK YOU ORDERED IS OUT OF STOCK.                                   │  │
│      ──521                                                          │  │
│ WE GREATLY APPRECIATE THAT YOU SELECT SUPPORTING METHOD FROM        │  │
│ FOLLOWING OPTIONS (CHECK ○ IN PARENTHESIS) AND SEND US YOUR REPLY   │  │
│ MAIL. PLEASE SEND REPLY MAIL BY XXXX (TIME) XX (MONTH) XX (DATE)    │  ⎬ 520
│ XXXX (YEAR).                                                        │  │
│                                                                     │  │
│ 522 →  ( )  1. CANCEL ALL PRODUCTS                                  │  │
│                                                                     │  │
│ 523 →  ( )  2. CANCEL ALL PRODUCTS IN THE SAME GROUP AS THE OUT-OF-STOCK PRODUCT │
│                                                                     │  │
│ 524 →  ( )  3. CANCEL ONLY OUT-OF-STOCK PRODUCT                     │  │
│                                                                     │  │
│ 525 →  ( )  4. CANCEL OUT-OF-STOCK PRODUCT, AND ORDER BEEF          │  ⎭
└─────────────────────────────────────────────────────────────────────┘
```

FIG. 18

| GROUP | PRODUCT NAME | | STANDARD | QUANTITY | AMOUNT OF MONEY |
|---|---|---|---|---|---|
| 1 [C] | BEEF | [C] | XXXXXXXXXXXXXXXX | 1 | XXXyen |
| | ONION | [C] | XXXXXXXXXXXXXXXX | 1 | XXXyen |
| | GREEN PEPPER | [C] | XXXXXXXXXXXXXXXX | 1 | XXXyen |
| | EGGPLANT | [C] | XXXXXXXXXXXXXXXX | 1 | XXXyen |
| | BEER | [C] | XXXXXXXXXXXXXXXX | 1 | XXXyen |
| | COAL | [C] | XXXXXXXXXXXXXXXX | 1 | XXXyen |
| | ● ONION | [C] | XXXXXXXXXXXXXXXX | 1 | XXXyen |
| 2 [C] | PORK | [C] | XXXXXXXXXXXXXXXX | 1 | XXXyen |
| | POTATO | [C] | XXXXXXXXXXXXXXXX | 1 | XXXyen |
| | CARROT | [C] | XXXXXXXXXXXXXXXX | 1 | XXXyen |
| | SHIRATAKI | [C] | XXXXXXXXXXXXXXXX | 1 | XXXyen |
| 3 [C] | SANDWICH LOAF | [C] | XXXXXXXXXXXXXXXX | 1 | XXXyen |
| | EGG | [C] | XXXXXXXXXXXXXXXX | 1 | XXXyen |
| | YOGURT | [C] | XXXXXXXXXXXXXXXX | 1 | XXXyen |
| 4 [C] | RICE CRACKER | [C] | XXXXXXXXXXXXXXXX | 1 | XXXyen |
| | SHAMPOO | [C] | XXXXXXXXXXXXXXXX | 1 | XXXyen |
| X | BALLPOINT PEN | [C] | XXXXXXXXXXXXXXXX | 1 | XXXyen |
| | PICKLED SHALLOT | [C] | XXXXXXXXXXXXXXXX | 1 | XXXyen |
| | | | SUM OF PRODUCTS | | XXXXyen |
| | | | SHIPPING FEE | | XXXXyen |
| | | | TOTAL SUM | | XXXXyen |

ORDERED PRODUCTS

YOU MAY CANCEL PRODUCT IN GROUP UNITS.

PLEASE SPECIFY DELIVERY DATE AND TIME.

HEISEI XX YEAR ▼ | XX MONTH ▼ | XX DAY ▼ | XX:XX~XX:XX ▼

NEXT (PAYMENT METHOD SELECTION)

FIG. 20

| TRANSMISSION SOURCE: xxxx@xxxx.co.jp |
|---|
| TRANSMISSION DATE AND TIME: XX (MONTH) XX (DAY) XX:XX |
| TITLE: OUT-OF-STOCK PRODUCT INFORMATION NOTICE |
| ONION YOU ORDERED IS OUT OF STOCK. ←521<br><br>WE GREATLY APPRECIATE THAT YOU SELECT SUPPORTING METHOD FROM FOLLOWING OPTIONS (CHECK ○ IN PARENTHESIS) AND SEND US YOUR REPLY MAIL. PLEASE SEND REPLY MAIL BY XXXX (TIME) XX (MONTH) XX (DATE) XXXX (YEAR).<br><br>522 → ( ) 1. CANCEL ALL PRODUCTS<br><br>523-1 → ( ) 2-1. CANCEL ALL PRODUCTS IN GROUP 1 INCLUDING OUT-OF-STOCK PRODUCT<br>        OTHER PRODUCTS INCLUDED IN GROUP 1: BEEF, GREEN PEPPER, EGG PLANT, BEER AND COAL<br><br>523-2 → ( ) 2-2. CANCEL ALL PRODUCTS IN GROUP 2 INCLUDING OUT-OF-STOCK PRODUCT<br>        OTHER PRODUCTS INCLUDED IN GROUP 2: PORK, POTATO, CARROT AND SHIRATAKI<br><br>524 → ( ) 3. CANCEL ONLY OUT-OF-STOCK PRODUCT<br><br>525 → ( ) 4. CANCEL OUT-OF-STOCK PRODUCT, AND ORDER BELGIAN SHALLOT |

510 (header section), 520 (body section)

FIG. 21

| | ORDERED PRODUCTS | | | | |
|---|---|---|---|---|---|
| | GROUP | PRODUCT NAME | STANDARD | QUANTITY | AMOUNT OF MONEY |
| 211-1 | 1 | BEEF | XXXXXXXXXXXXXXXX | 1 | XXXyen |
| | | ONION | XXXXXXXXXXXXXXXX | 1 | XXXyen |
| | | GREEN PEPPER | XXXXXXXXXXXXXXXX | 1 | XXXyen |
| | | EGGPLANT | XXXXXXXXXXXXXXXX | 1 | XXXyen |
| | | BEER | XXXXXXXXXXXXXXXX | 1 | XXXyen |
| | | COAL | XXXXXXXXXXXXXXXX | 1 | XXXyen |
| 211-2 | 2 | PORK | XXXXXXXXXXXXXXXX | 1 | XXXyen |
| | | POTATO | XXXXXXXXXXXXXXXX | 1 | XXXyen |
| | | CARROT | XXXXXXXXXXXXXXXX | 1 | XXXyen |
| | | SHIRATAKI | XXXXXXXXXXXXXXXX | 1 | XXXyen |
| 211-3 | 3 | SANDWICH LOAF | XXXXXXXXXXXXXXXX | 1 | XXXyen |
| | | EGG | XXXXXXXXXXXXXXXX | 1 | XXXyen |
| | | YOGURT | XXXXXXXXXXXXXXXX | 1 | XXXyen |
| 211-4 | 4 | RICE CRACKER | XXXXXXXXXXXXXXXX | 1 | XXXyen |
| | | SHAMPOO | XXXXXXXXXXXXXXXX | 1 | XXXyen |
| 212 | × | BALLPOINT PEN | XXXXXXXXXXXXXXXX | 1 | XXXyen |
| | | PICKLED SHALLOT | XXXXXXXXXXXXXXXX | 1 | XXXyen |
| | | | SUM OF PRODUCTS | | XXXXyen |
| | | | SHIPPING FEE | | XXXyen |
| | | | TOTAL SUM | | XXXXyen |

WHEN PRODUCT INCLUDED IN GROUP IS OUT OF STOCK, YOU MAY CANCEL PRODUCT IN GROUP UNITS.

PLEASE SPECIFY DELIVERY DATE AND TIME.

HEISEI XX YEAR ▼ | XX MONTH ▼ | XX DAY ▼ | XX:XX~XX:XX ▼

NEXT (PAYMENT METHOD SELECTION)

SERVER APPARATUS, PRODUCT GROUPING METHOD, PRODUCT GROUPING PROGRAM, RECORDING MEDIUM WITH COMPUTER-READABLE PRODUCT GROUPING PROGRAM RECORDED THEREON AND PRODUCT GROUPING SYSTEM

CROSS REFERENCE TO RELATED APPLICATION

This application is a National Stage of International Application No. PCT/JP2011/058111, filed on Mar. 30, 2011, which claims priority from Japanese Patent Application Nos. 2010-081992 and JP 2010-081995, filed on Mar. 31, 2010, the contents of all of which are incorporated herein by reference in their entirety.

TECHNICAL FIELD

The present invention relates to a technical field of a server apparatus, a product grouping method, a product grouping program, a recording medium with a computer-readable product grouping program recorded thereon and a product grouping system.

BACKGROUND ART

In recent years, a shopping site is known in which stores are listed on the Internet. A user of a shopping site selects a desired product from products listed in the shopping site by a seller, and performs order procedure and then orders the selected product (see, for example, Patent Literature 1).

CITATION LIST

Patent Literature

PTL 1: Japanese Patent Application Laid-Open No. 2002-236694

SUMMARY OF THE INVENTION

Problem to be Solved by the Invention

Meanwhile, even when an orderer orders a plurality of products in such a shopping site, each ordered product is handled independently. However, when an orderer orders a plurality of products, there are not a few products which are desirably handled together since there is some relevance between products ordered, for example. In spite of this, this has never been taken into consideration.

The present invention is made in view of this problem, and an example of the task of the present invention is to provide a server apparatus, a product grouping method, a product grouping program, a recording medium with a computer-readable product grouping program recorded thereon and a product grouping system which can group a plurality of order scheduled products which a user wishes to order, and realize processing in group units.

Means for Solving the Problem

In order to solve the above problem, an invention described in claim 1 is a server apparatus which is connected with a terminal apparatus through a network, the server apparatus comprising: a receiving means that receives, from the terminal apparatus, order scheduled product information indicating a plurality of order scheduled products selected by a user; a grouping means that groups the plurality of order scheduled products indicated by the order scheduled product information received by the receiving means, based on a product group stored in a product group storing means that stores a correspondence between a product group and a plurality of products belonging to the product group, and generates at least one or more groups; and a transmitting means that transmits, to the terminal apparatus, grouping result information indicating to which group each order scheduled product grouped in the grouping means among the plurality of order scheduled products indicated by the received order scheduled product information is grouped.

According to the present invention, a plurality of order scheduled products which the user wishes to order are grouped, so that it is possible to process the order scheduled products in group units. Consequently, it is possible to independently handle a group in one order schedule and, consequently, for example, make a cancellation or handle alternate products in group units. Meanwhile, a product here refers to one traded in a market.

An invention described in claim 2 is The server apparatus according to claim 1, wherein the product group storing means stores a product group per user, and associates and stores a product group with user identification information for identifying a user, the receiving means further receives user identification information of a user who selects the plurality of order scheduled products indicated by the order scheduled product information, from the terminal apparatus, and the grouping means groups the plurality of order scheduled products indicated by the received order scheduled product information, based on a product group associated with user identification information of a user who selects the order scheduled products.

According to the present invention, it is possible to manage a product group per user according to a user specific combination of products.

An invention described in claim 3 is The server apparatus according to claim 2, wherein the receiving means further receives, from the terminal apparatus, user generated group information indicating a product group generated when a user groups the plurality of order scheduled products indicated by received order scheduled product information, and the server apparatus further comprises a group editing means that associates and stores in the product group storing means a correspondence between the product group indicated by the user generated group information received by the receiving means and a plurality of products belonging to the product group with user identification information of the user who generates the product group.

According to the present invention, the user associates and stores the product group generated when the user orders products with user identification information of the user, and groups order scheduled products based on the product group generated by the user. Consequently, it is possible to perform grouping matching user's behavioral characteristics.

An invention described in claim 4 is The server apparatus according to any one of claim 1 to claim 3, wherein the product group storing means stores a correspondence between a plurality of product groups and a plurality of products belonging to each product group, and the grouping means repeats, for order scheduled products which are not grouped, grouping processing of comparing a plurality of products belonging to each of a plurality of product groups stored in the product group storing means and a plurality of order scheduled products indicated by the received order scheduled product information, specifying as a maximum product group a product group to which a maximum number of order scheduled products belong, and grouping as one group a product belonging to the maximum product group specified among the order scheduled products.

According to the present invention, grouping processing is repeated of grouping order scheduled products based on a product group to which a largest number of order scheduled products belong. When the number of belonging products is large, this group is highly likely to be used. Consequently, it is possible to realize a grouping which is predicted that the user is highly likely to desire.

An invention described in claim 5 is The server apparatus according to any one of claim 1 to claim 3, wherein the product group storing means stores a correspondence between a plurality of product groups and a plurality of products belonging to each product group, and the grouping means groups an order scheduled product per product group by comparing a plurality of products belonging to each of a plurality of product groups stored in the product group storing means and a plurality of order scheduled products indicated by the received order scheduled product information, and groups an order scheduled product belonging to a plurality of product groups into all product groups to which the order scheduled product belongs.

According to the present invention, when there is a product of the order scheduled products belonging to a plurality of product groups, the user can check all over to which product group the product belongs.

An invention described in claim 6 is The server apparatus according to claim 4, wherein the grouping means when there are a plurality of product groups which comprise a same number of belonging order scheduled products and to which a maximum number of order scheduled products belong, and at least part of order scheduled products belonging to each of the plurality of product groups are different, counts a number of belonging product groups for each of the different products by referring to the product group storing means, and specifies as the maximum product group a product group to which the counted maximum number of products belong.

According to the present invention, when there are a plurality of product groups to which a maximum number of order scheduled products belong and at least part of order scheduled products belonging to each product group are different, order scheduled products are grouped based on a product group to which a product belonging to a greater number of product groups belongs among the different products. Consequently, it is possible to group a product which is highly likely to be ordered in relation to another product.

An invention described in claim 7 is the server apparatus according to claim 6, wherein the product group storing means further stores a use frequency of each product group used when an order scheduled product is previously grouped, and when specifying the product group to which the counted maximum number of products belong, if there are a plurality of product groups of the same counted number, the grouping means specifies a product group of a highest use frequency among the plurality of product groups as the maximum product group by referring to a product group means.

According to the present invention, order scheduled products are grouped based on a product group of a higher use frequency. Consequently, it is possible to realize grouping which is predicted that the user is highly likely to desire.

An invention described in claim 8 is The server apparatus according to claim 6, further comprising a history information storing means that associates and stores a history of a product groups used by the grouping means to group an order scheduled product, with user identification information of a user, wherein, when specifying the product group to which the counted maximum number of products belong, if there are a plurality of product groups of the same counted number, the grouping means refers to the history information storing means based on user identification information of a user who selects the order scheduled product indicated by the order scheduled product information received by the receiving means, and specifies as the maximum product group a product group, among the plurality of product groups, which is used to group an order scheduled product that the user has selected previously and which is used most recently.

According to the present invention, to group order scheduled products selected by the user this time, a product group is used which is previously used to group order scheduled products selected by the same user and which is used most recently. The grouping is based on the latest behavior history of the user, so that it is possible to realize grouping which is predicted that the user is highly likely to desire.

An invention described in claim 9 is The server apparatus according to any one of claim 1 to claim 8, wherein the receiving means further receives, from the terminal apparatus, cancellation information indicating a group to be cancelled among a group indicated by the grouping result information transmitted by the transmitting means.

According to the present invention, the user can cancel order scheduled products in group units.

An invention described in claim 10 is The server apparatus according to any one of claim 1 to claim 9, wherein a product selected by the user as the order scheduled product is handled at an internet supermarket.

In an internet supermarket site which is a site of an internet supermarket (hereinafter, referred to as "internet supermarket"), products ranging over various types such as fresh produce and convenient goods are handled, and therefore users frequently exhibit purchase behaviors matching a plurality of purposes when placing one order. That is, even though one order is placed, a plurality of purposes are satisfied in this order. Hence, it is required to group and independently handle a plurality of order scheduled products when placing one order. Thus, it is possible to perform processing of, for example, making cancellation or ordering alternate products independently per group, so that user's convenience increases. Further, by managing a product group in user units, it is possible to perform grouping matching a user specific recipe or behavioral characteristics such as a life pattern or a behavior pattern.

An invention described in claim 11 is The server apparatus according to any one of claims 1 to 10, wherein the order scheduled product information further includes information indicating an order quantity of each of the order scheduled product, and the server apparatus comprises: an out-of-stock checking means that checks that an order scheduled product indicated by the order scheduled product information received by the receiving means is out of stock; a presented proposal transmitting means that, when the out-of-stock checking means confirms that the order scheduled product is out of stock, transmits to an electronic mail address of a user an electronic mail presenting information for specifying an out-of-stock product and at least one of the proposals of (a) canceling an order of an out-of-stock product and (b) canceling an order of an out-of-stock product and ordering an alternate product for the out-of-stock product; and a selection information acquiring means that acquires information indicating which one of the presented proposal is selected.

According to the present invention, when an order product is out of stock, an electronic mail presenting supporting methods by options including a plurality of proposals is transmitted to an electronic mail address of the user, and information indicating the proposal selected by the user is acquired on the server apparatus side. Consequently, even when an ordered product is out of stock, it is possible to easily check on the server apparatus side a supporting method which the user prefers. Meanwhile, a product here refers to one traded in a market.

An invention described in claim 12 is The server apparatus according to claim 11, wherein the receiving means further receives specified date and time information indicating a specified delivery date and time of the order scheduled product indicated by the order scheduled product information, and by referring to a stock information storing means that records stock information indicating a number of stocks of products a predetermined time before the specified delivery date and time indicated by the specified date and time information and checking whether or not there are products for which stocks corresponding to an order quantity are held among the order scheduled product indicated by the received order scheduled product information, the out-of-stock checking means checks that the order scheduled product indicated by the order scheduled product information is out of stock.

According to the present invention, the out-of-stock checking means decides whether or not an order product is out of stock, and, when the ordered product is out of stock, transmits an electronic mail presenting options of a supporting method a predetermined time before the specified delivery date and time. Thus, the electronic mail presenting the supporting method is transmitted to the user a predetermined time before the specified delivery date and time, so that the user can transmit a desired supporting method before the products are actually delivered.

An invention described in claim 13 is The server apparatus according to claim 12, further comprising: an interchangeable relationship storing means that associates and stores a product with a product interchangeable with the product; and an alternate product selecting means that refers to the stock information storing means, judges for a product associated and interchangeable with the out-of-stock product whether or not there is a stock corresponding to an order quantity specified by the order scheduled product information, and selects the interchangeable product as the alternate product when deciding that there is a stock corresponding to an order quantity, wherein the presented proposal transmitting means presents the alternate product selected by the alternate product selecting means in a proposal of (b) ordering an alternate product for an out-of-stock product.

According to the present invention, even when an order product is out of stock, it is possible to present to an orderer as an alternate product a product which is interchangeable with an out-of-stock product and which is in stock. Consequently, when a product ordered by the user is out of stock, it is possible to check an interchangeable product once before placing the order to order the alternate product.

An invention described in claim 14 is The server apparatus according to claim 12, further comprising: the receiving means receives order store information indicating to which store of a plurality of stores an order of the order scheduled product indicated by the order scheduled product information is placed; the stock information storing means stores the stock information per store; an interchangeable relationship storing means that associates and stores a product with a product interchangeable with the product; and an alternate product selecting means that refers to the stock information storing means, judges for an interchangeable product associated with the out-of-stock product at the store indicated by the order store information whether or not there is a stock of a product corresponding to an order quantity specified by the order scheduled product information, and selects the interchangeable product as the alternate product when deciding that there is a stock corresponding to an order quantity; and wherein the presented proposal transmitting means presents the alternate product selected by the alternate product selecting means in a proposal of (b) ordering an alternate product for an out-of-stock product.

According to the present invention, it is possible to present to the orderer as an alternate product a product which is handled at a store which has received the order, which is interchangeable with the out-of-stock product and which is in stock. Consequently, when a product ordered by the user is out of stock, it is possible to check an interchangeable product once before placing the order to order the alternate product.

An invention described in claim 15 is The server apparatus according to claim 13 or claim 14, wherein the alternate product selecting means refers to a classification information storing means that stores classification information indicating a product classification of a product per each product, acquires as an interchangeable product a product which belongs to a same product classification as the out-of-stock product and determines for the acquired interchangeable product whether or not there is a stock corresponding to an order quantity.

According to the present invention, it is possible to present to the orderer as an alternate product a product which belongs to the same classification as the out-of-stock product, and which is readily acceptable for the orderer as the alternate product.

An invention described in claim 16 is The server apparatus according to anyone of claim 13 to claim 15, wherein the stock information storing means further stores price information indicating a price of a product per product, and when there are a plurality of types of interchangeable products for which stocks corresponding to order quantities are held, the alternate product selecting means refers to the price information, and selects as the alternate product a product of a type having the price closest to the price of the out-of-stock product.

According to the present invention, it is possible to present to the orderer as an alternate product a product which has a price close to the out-of-stock product, and which is acceptable for the orderer as the alternate product.

An invention described in claim 17 is The server apparatus according to any one of claim 11 to claim 16, wherein the out-of-stock checking means checks whether or not even one of the plurality of order scheduled products indicated by the order scheduled product information received by the receiving means is out of stock, and the electronic mail transmitted by the presented proposal transmitting means further includes a proposal of (c) canceling all of the plurality of order scheduled products.

According to the present invention, when a plurality of products are ordered, if part of products are out of stock, it is possible to present not only a proposal of canceling the out-of-stock products but also a proposal of canceling all of the plurality of order products.

An invention described in claim 18 is The server apparatus according to claim 17, wherein the out-of-stock checking means checks whether or not there are two or more out-of-stock products among the plurality of order scheduled products indicated by the order scheduled product information received by the receiving means, and the proposal of (a) canceling the order of the out-of-stock product, in the electronic mail transmitted by the presented proposal transmitting means presents cancellation of the plurality of products which the out-of-stock checking means confirms as out-of-stock products.

According to the present invention, when a plurality of products are ordered, if a plurality of part of products are out of stock, it is possible to present only a proposal of canceling only the plurality of out-of-stock products.

An invention described in claim 19 is The server apparatus according to any one of claim 11 to claim 18, wherein the electronic mail includes beneficial information which is beneficial to the orderer.

According to the present invention, it is possible to transmit beneficial information in an electronic mail for confirming a supporting method when there is an out-of-stock product. Consequently, it is possible to reduce the cost of distributing beneficial information.

An invention described in claim 20 is The server apparatus according to claim 19, wherein the beneficial information is discount information of a product.

According to the present invention, it is possible to encourage an orderer's motivation for placing an order.

An invention described in claim 21 is A product grouping method comprising: a step of receiving, at a computer, from a terminal apparatus order scheduled product information indicating a plurality of order scheduled products selected by a user; a step of grouping the plurality of order scheduled products indicated by the received order scheduled product information at the computer based on a correspondence between a product group and a plurality of products belonging to the product group, and generating at least one or more groups; and a step of transmitting, at the computer, to the terminal apparatus grouping result information indicating to which group each grouped order scheduled product among the plurality of order scheduled products indicated by the received order scheduled product information is grouped.

An invention described in claim 22 is A product grouping program causing a computer to function as: a receiving means that receives, from a terminal apparatus, order scheduled product information indicating a plurality of order scheduled products selected by a user; a grouping means that groups the plurality of order scheduled products indicated by the received order scheduled product information, based on a correspondence between a product group and a plurality of products belonging to the product group, and generates at least one or more groups; and a transmitting means that transmits, to the terminal apparatus, grouping result information indicating to which group each grouped order scheduled product among the plurality of order scheduled products indicated by the received order scheduled product information is grouped.

An invention described in claim 23 is A recording medium with a computer-readable product grouping program recorded thereon which causes a computer to function as: a receiving means that receives, from a terminal apparatus, order scheduled product information indicating a plurality of order scheduled products selected by a user; a grouping means that groups the plurality of order scheduled products indicated by the received order scheduled product information, based on a correspondence between a product group and a plurality of products belonging to the product group, and generates at least one or more groups; and a transmitting means that transmits, to the terminal apparatus, grouping result information indicating to which group each grouped order scheduled product among the plurality of order scheduled products indicated by the received order scheduled product information is grouped.

An invention described in claim 24 is A product grouping system comprising: a terminal apparatus; and a server apparatus which is connected with the terminal apparatus through a network, wherein the server apparatus comprises: a receiving means that receives, from the terminal apparatus, order scheduled product information indicating a plurality of order scheduled products selected by a user; a grouping means that groups the plurality of order scheduled products indicated by the order scheduled product information received by the receiving means, based on a product group stored in a product group storing means that stores a correspondence between a product group and a plurality of products belonging to the product group, and generates at least one or more groups; and a transmitting means that transmits, to the terminal apparatus, grouping result information indicating to which group each order scheduled product grouped in the grouping means among the plurality of order scheduled products indicated by the received order scheduled product information is grouped, and the terminal apparatus comprises: an order scheduled product transmitting means that transmits the order scheduled product information to the server apparatus; and a grouping result receiving means that receives the grouping result information from the server apparatus.

Effect of the Invention

Consequently, according to the present invention, a plurality of products which the user is scheduled to order are grouped, so that it is possible to process order scheduled products in group units.

BRIEF DESCRIPTION OF THE DRAWINGS

FIG. 4 is a view for describing an example of registered content of a group DB according to the present embodiment.

FIG. 5 is a sequence diagram illustrating a processing example of the order receiving system upon reception of an order.

FIG. 6 is a view illustrating an example of an order product screen.

FIG. 7 is a sequence diagram illustrating a processing example of the order receiving system upon reception of an order.

FIG. 10 is a view for describing an example when order products are grouped by grouping processing.

FIG. 11 is a view for describing an example when order products are grouped by grouping processing.

FIG. 12 is a view for describing an example when order products are grouped by grouping processing.

FIG. 13 is a view for describing an example when order products are grouped by grouping processing.

FIG. 14 is a sequence diagram illustrating a processing example of the order receiving system when an out-of-stock product is taken care of.

FIG. 15 is a view illustrating an example of a support confirmation mail.

FIG. 17 is a sequence diagram illustrating a processing example of the order receiving system when an out-of-stock product is taken care of.

FIG. 18 is a view illustrating an example of an order product screen.

FIG. 20 is a view illustrating an example of a support confirmation mail.

FIG. 21 is a view illustrating an example of an order product screen.

MODES FOR CARRYING OUT THE INVENTION

Hereinafter, embodiments of the present invention will be described with reference to the drawings. In addition, an embodiment will be described below where the present invention is applied to an order receiving system.

1. Outline of Configuration and Function of Order Receiving System

First, an outline of a configuration and a function of an order receiving system S according to an embodiment of the present invention will be described using FIG. 1.

Figure 1:
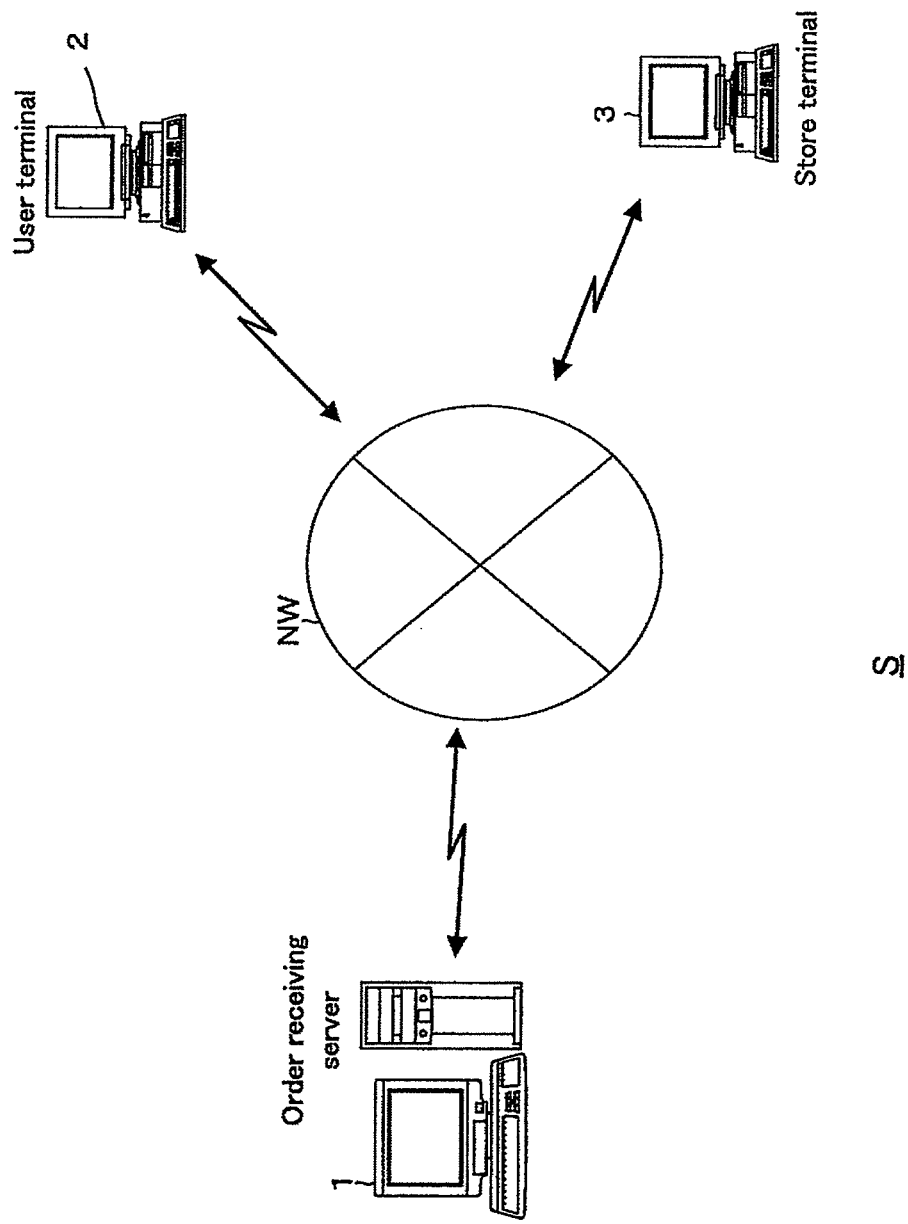
FIG. 1 is a view illustrating an example of a configuration of an order receiving system according to the present embodiment.

As illustrated in FIG. 1, the order receiving system S (an example of a "product grouping system") is configured as an internet supermarket site including an order receiving server 1 (an example of a "server apparatus"), a user terminal 2 (an example of a "terminal apparatus") and a store terminal 3. In addition, although one user terminal 2 is illustrated with an example of FIG. 1 for ease of description, multiple user terminals can actually access the order receiving server 1. Similarly, the number of store terminals 3 also corresponds to the number of supermarkets which join an Internet supermarket site or the number of branch stores. Meanwhile, an internet supermarket refers to home delivery service of receiving orders of products through an Internet supermarket site provided on the Internet by existing supermarkets or operators who do not have stores and are specialized in delivery, and delivering order products to houses of orderers.

The order receiving server 1, the user terminal 2 and the store terminal 3 can transmit and receive data to and from each other using, for example, TCP/IP for a communication protocol through a network NW. In addition, the network NW is constructed with, for example, the Internet, a dedicated communication line (for example, CATV (Community Antenna Television) line), a mobile communication network (including, for example, base stations) and a gateway.

The order receiving server 1 is a server installed to operate an internet supermarket site in which a plurality of stores join, and receives orders of products from the user terminals 2 and enables store terminals 3 of specified stores to check an order content. The order receiving server 1 according to the present invention in particular has a function of grouping an order product (an example of "order scheduled product") selected by an orderer (an example of a "user"), and generating at least one or more groups. Further, the order receiving server 1 according to the present embodiment has a function of inquiring an orderer what action store staff need to take using an e-mail ("support confirmation mail") when there is a product (hereinafter "out-of-stock product") which is out of stocks among products ordered by the user (hereinafter "order product").

The user terminal 2 has a web browser function, and transmits, for example, a HTTP (Hyper Text Transfer Protocol) request to the order receiving server 1 and acquires, for example, a web page as a response, and displays the web page on a display. The user of the user terminal 2 can use information providing service provided from an internet supermarket site or a seller site. Further, the user terminal 2 receives an e-mail (an example of an "electronic mail") transmitted to an address of the e-mail address of the user using an electronic mail client (including a web mail), and displays the e-mail on the display. In addition, to the user terminal 2, for example, a personal computer, a PDA (Personal Digital Assistant) or a mobile telephone is applicable.

Similar to the user terminal 2, the store terminal 3 has a web browser function, and transmits, for example, a HTTP (Hyper Text Transfer Protocol) request to the order receiving server 1 and acquires, for example, a web page as a response, and displays the web page on a display. Further, the store terminal 3 accesses the order receiving server 1, and displays order contents accumulated in the order receiving server 1 on the display. Accordingly, store staff can check an order placed on this store.

2. Configuration of Order Receiving Server 1

Next, a configuration of the order receiving server 1 will be described using FIGS. 2 to 4.

Figure 2:
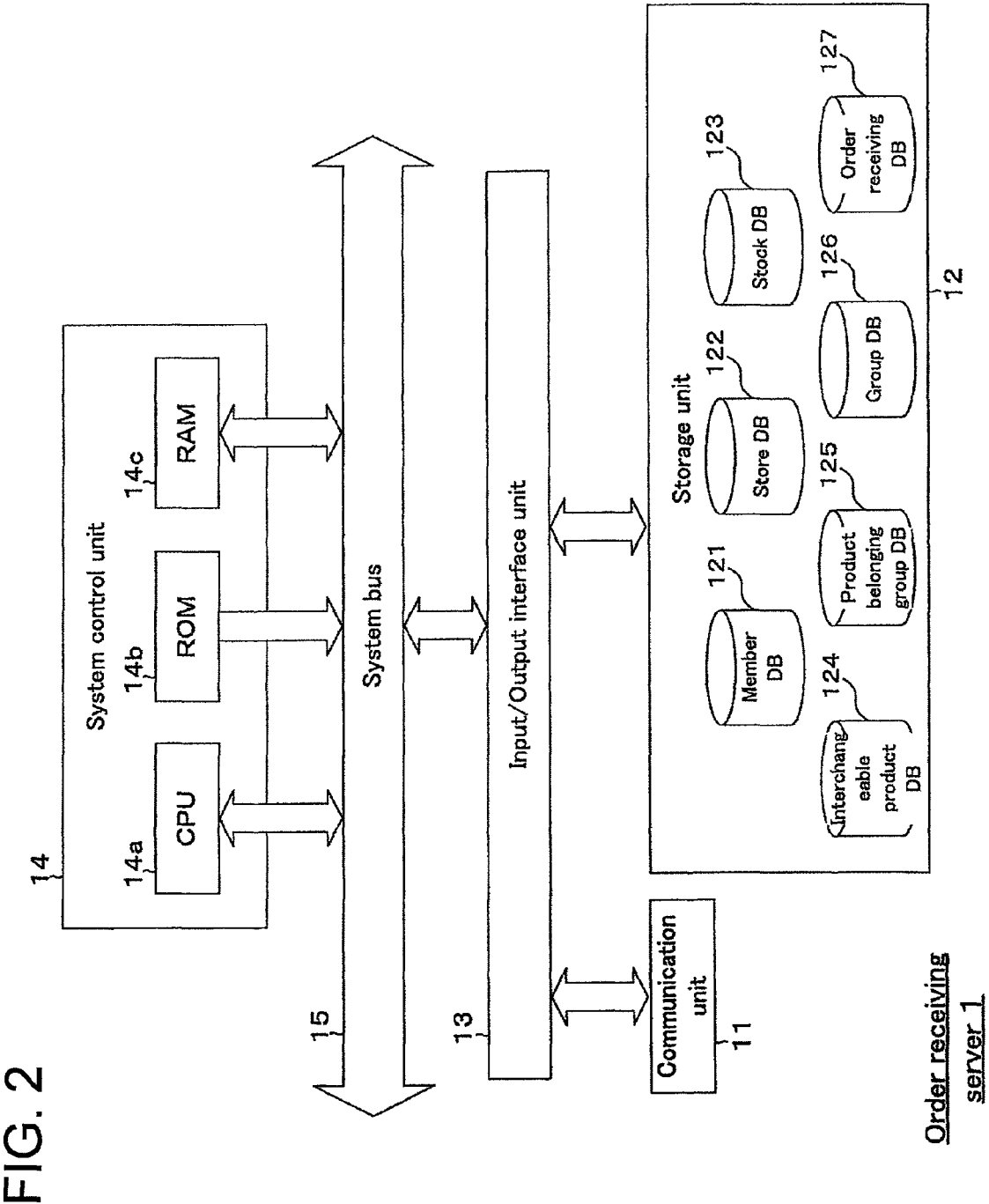
FIG. 2 is a block diagram illustrating an example of a configuration of an order receiving server according to the present embodiment.
Figure 3:
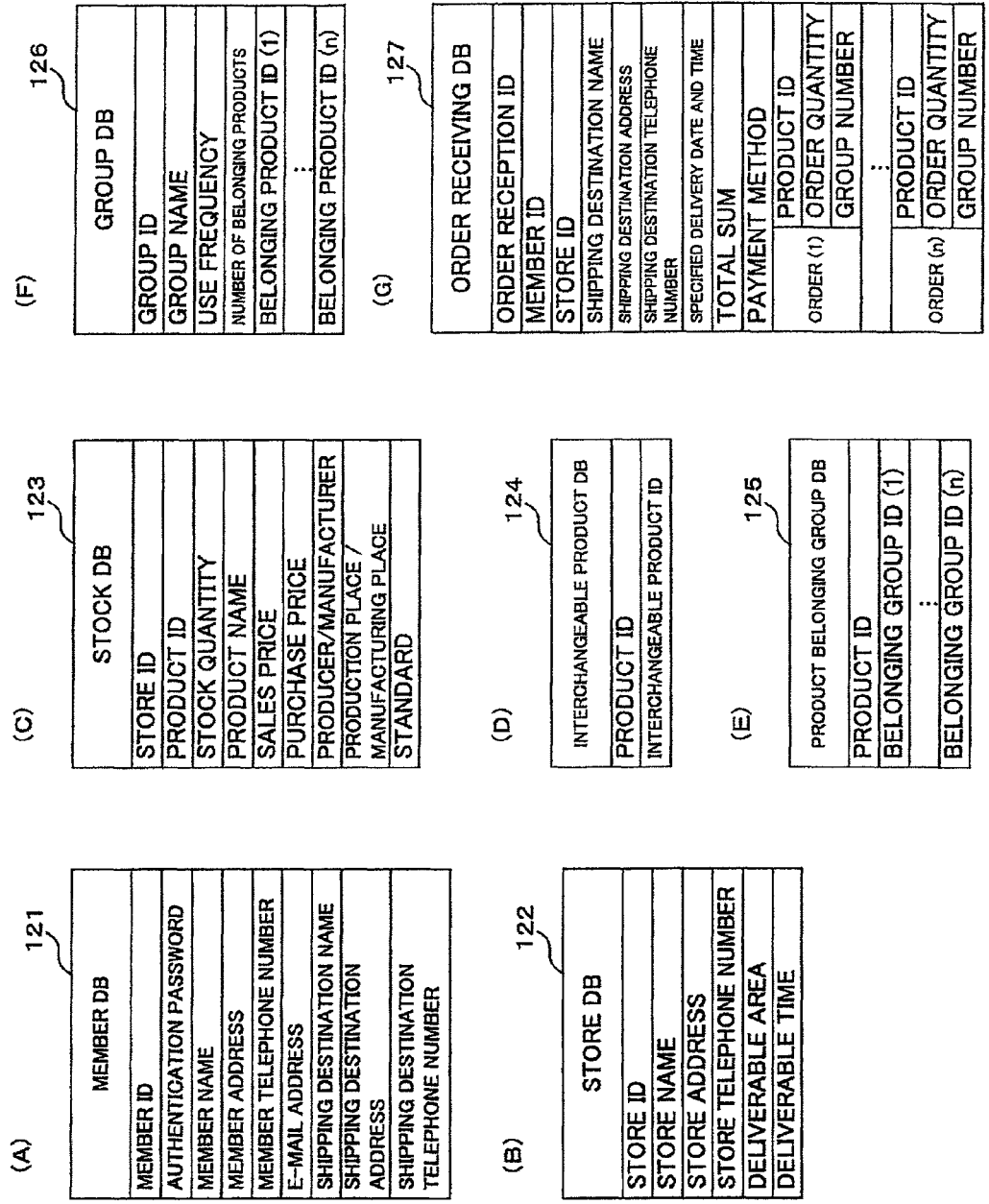
FIG. 3 is a view illustrating an example of contents registered in various databases.

As illustrated in FIG. 2, the order receiving server 1 has a communication unit 11, a storage unit 12, an input/output interface unit 13 and a system control unit 14. Further, the system control unit 14 and the input/output interface unit 13 are connected through a system bus 15.

The communication unit 11 connects to the network NW to control communication state with the user terminal 2 or the store terminal 3.

The storage unit 12 (an example of a "storing means") employs a configuration including, for example, a hard disc drive. Further, in the storage unit 12, a member DB (Data Base) 121, a store DB 122, a stock DB 123, an interchangeable product DB 124, a product belonging group DB 125, a group DB 126 and an order receiving DB 127 are constructed.

In the member DB 121 illustrated in FIG. 3A, member information indicating a member ID (an example of "user identification information"), an authentication password, a member name, a member address, a member telephone number, an e-mail address, a shipping destination name, a shipping destination address and a shipping telephone number of a registered member (who is a user of an internet supermarket and is an orderer when an order is placed). Member information can be identified per member based on a member ID. Meanwhile, a member ID is an identifier for identifying a member. Further, a shipping destination is a delivery destination of a product purchased at an internet supermarket. Further, a member ID and an authentication password are log-in information used for log-in processing (authentication processing of a member).

In the store DB 122 illustrated in FIG. 3B, store information indicating, for example, a store ID, a store name, a store address, a store telephone number, a deliverable area and a deliverable time of a supermarket (including a branch store) listed as an Internet supermarket is registered. As deliverable times, a plurality of time zones are registered. For example, "8 o'clock to 10 o'clock", "10 o'clock to 12 o'clock", "12 o'clock to 14 o'clock", . . . and "18 o'clock to 20 o'clock" are registered as deliverable times. Store information can be identified per supermarket listed as an internet supermarket or per branch store based on a store ID. Meanwhile, a store ID is an identifier for identifying a listed store or a listed branch store.

In the stock DB 123 (an example of a "stock information storing means") illustrated in FIG. 3C, stock information indicating a stock quantity, and product information indicating a product name, a sales price, a purchase price, a producer/manufacturer, a production place/manufacturing place and a standard are registered per store ID and per product ID of a product handled at a store identified based on the store ID. The standard refers to, for example, the size or the volume of a product. A product ID is an identifier for identifying a product. Stock information registered in the stock DB 123 is appropriately updated based on information received from the store terminal 3 installed at each store. Further, the stock DB 123 may be provided in a storage unit in the store terminal 3 installed at each store instead of in the order receiving server 1 to allow the order receiving server 1 to access the stock DB 123 in the store terminal 3.

In the interchangeable DB 124 illustrated in FIG. 3D, a product ID ("interchangeable product ID") of a product interchangeable with a product identified by a product ID is registered per product ID. Examples of products in interchangeable relationship include, for example, beef and pork, a potato made in Hokkaido and a potato made in Chiba, and coke made by a company A and coke made by a company B. Alternatively, other examples in interchangeable relationships include, for example, a potato and a taro, and a ballpoint pen and a pen. In addition, a plurality of interchangeable product IDs may be associated with one product ID. For example, as an interchangeable product of a potato made in Hokkaido, a potato made in Chiba and a potato made in Nagasaki can be associated.

In the product belonging group DB 125 illustrated in FIG. 3E, a group ID ("belonging group ID") of a group (an example of a "product group") to which a product identified based on a product ID belongs is registered per product ID. When one product belongs to a plurality of groups, respective group IDs are registered as belonging group ID(1), . . . and a belonging group ID(n). Meanwhile, a group ID refers to an identifier for identifying a group. In addition, in the product belonging group DB 125, product IDs of the products which do not belong to any group are not registered.

In the group DB 126 illustrated in FIG. 3F, a group name, a use frequency, the number of belonging products and a belonging product ID are registered per group ID. A group identified based on a group ID is formed with a plurality of products. A group name is a name given to a group. The number of belonging products is the number of products included in a group. A belonging product ID is a product ID of a product included in a group. A plurality of products are included in a group, and a product ID of each product is registered as a belonging product ID (1), . . . and a belonging product ID(n). A group registered in the group DB 126 is used to group an order product. A use frequency corresponds to a frequency used to group an order product, and is adequately updated.

The product belonging group DB 125 and the group DB 126 function as a product group storing means. In the group DB 126, a group matching a cooking recipe (for example, sukiyaki and simmered meat and potatoes) or a purpose for use (for example, barbecue, breakfast or travel) is stored together with products matching each recipe or purpose.

Meanwhile, a registration example in the group DB 126 will be described with reference to FIG. 4. FIG. 4 illustrates a "sukiyaki" group, a "breakfast" group and a "midnight snack" group as an example of groups. For example, products belonging to the "night snack" group include a cup noodle, a frozen roasted rice ball, coffee and cocoa. In this case, in the group DB 126, a group name "night snack" is registered as the "night snack" group. Further, product IDs associated with a cup noodle, a frozen roasted rice ball, coffee and cocoa are registered as a belonging product ID(1) to a belonging product ID(4), and "4" is registered as the number of belonging products.

In addition, one product belongs to a plurality of groups and, for example, "onion" belongs to each of a "sukiyaki" group, a "barbecue" group, a "simmered meat and potatoes" group and a "curry" group.

In the order receiving DB 127 illustrated in FIG. 3G, a member ID of a member who orders products, a store ID of an order store, a shipping destination name, a shipping destination address, a shipping destination telephone number, a specified delivery date and time, a total amount, a payment method, and an order (1) {product ID, order quantity and group number}, . . . and an order (n) {product ID, order quantity and group number} are registered per order reception ID. In addition, the product ID of the order (1) is a product ID of a first order product, and the order quantity of the order (1) is an order quantity of the first order product. Further, a group number of the order (1) is a group number of the first order product. A group number indicates to which group an order product is grouped by grouping processing described below. That is, a product for which the same group number is registered indicates that the product is grouped in the same group. Meanwhile, a blank is registered as a group number for a non-group product described below. n of the order (n) represents the total number of types of ordered products.

Further, the storage unit 12 stores, for example, various HTML (Hyper Text Markup Language) documents configuring web pages of shopping sites, image data, sound data and text data.

Furthermore, the storage unit 12 stores various programs. More specifically, the storage unit 12 stores, for example, a predetermined OS (Operating System), a WWW (World Wide Web) server program and a shopping processing program. The WWW server program is a program of transmitting web pages to, for example, the user terminal 2 based on various items of data stored in the storage unit 12 according to a request transmitted from, for example, the user terminal 2, using a HTTP (Hyper Text Transfer Protocol) protocol. The shopping processing program is a program of performing processing of searching for and purchasing a product at a shopping site. In addition, various programs may be acquired from, for example, other server apparatus or the like through the network NW, or may be recorded in a disc DK such as a CD-ROM and read through a drive unit.

The input/output interface unit 13 performs interface processing between the communication unit 11 and the storage unit 12, and the system control unit 14.

The system control unit 14 has, for example, a CPU (Central Processing Unit) 14a, a ROM (Read Only Memory) 14b and a RAM (Random Access Memory) 14c. Further, when the CPU 14a reads and executes various programs stored in the ROM 14b and the storage unit 12, the system control unit 14 functions as a receiving means, a grouping means, a transmitting means, a canceling means, an out-of-stock checking means, a presented proposal transmitting means, a selection information acquiring means, an alternate product selecting means or the like.

In addition, the order receiving server 1 may employ a configuration including, for example, a plurality of server apparatuses such as a server which manages various databases, a search processing server which performs search processing of products and a WWW server which provides various pieces of information.

3. Operation of Order Receiving System

Next, an operation of the order receiving system S according to an embodiment of the present invention will be described using FIGS. 5 to 15.

[3.1. Operation of Reception of Order]

An operation of the order receiving server 1 from reception of an order of products from the user terminal 2 to registration of an order reception record in the order receiving DB will be described using FIGS. 5 to 13. In addition, before starting processing illustrated in the sequence diagram of FIG. 5, the user terminal 2 accesses an internet supermarket site, and displays a top page of the internet supermarket site on a display.

As illustrated in FIG. 5, when detecting an operation of transmitting a member ID and a password to the order receiving server 1, the user terminal 2 (more specifically, a system control unit (not illustrated) of the user terminal 2) transmits the input member ID and the password to the order receiving server 1 (step S101).

When receiving the member ID and the password, the system control unit 14 of the order receiving server 1 performs log-in processing (step S102). More specifically, when searching in the member DB 121 based on the received member ID, checking whether or not a corresponding member ID is registered and confirming that the corresponding ID is registered, the system control unit 14 checks whether or not the received password and an authentication password registered in the member DB 121 match. Further, only when the corresponding member ID is registered in the member DB 121 and matches with the password, the system control unit 14 decides that there is no problem in log-in processing.

When deciding that there is a problem in log-in processing, the system control unit 14 transmits error information indicating that an error occurs in log-in processing to the user terminal 2, and makes the display of the user terminal 2 display an error message. Meanwhile, when deciding that there is no problem in log-in processing, the system control unit 14 refers to the member DB 121, acquires a registered shipping destination address, then refers to the store DB 122 and acquires a list of stores or branch stores including the acquired shipping destination address in a deliverable area (step S103).

Next, the system control unit 14 generates a store list screen web page for displaying a store list screen (not illustrated) which displays the acquired shipping destination address and the store list (step S104), and transmits the store list screen web page to the user terminal 2 (step S105).

When receiving the store list screen web page, the user terminal 2 makes the display display the store list screen (not illustrated) (step S106). When the store list screen is displayed, a user (member) (i) checks whether or not the displayed shipping destination address is an address for receiving an ordered product, and (ii) selects an order (purchase) destination store. In addition, when the address includes an error or when a product is received at an address different from the shipping destination address, a correct address for receiving the product is transmitted as a new shipping destination address and a store list screen web page is received again from the order receiving server 1. In this case, when receiving the new shipping destination address, the system control unit 14 of the order receiving server 1 acquires again a store list including the new shipping destination address in the deliverable area, generates a store list screen web page for displaying the new shipping destination and the acquired store list, and transmits the store list screen web page to the user terminal 2.

When the user selects an order destination store, the user terminal 2 transmits a store ID of the selected store to the order receiving server 1 (step S107).

When receiving the store ID, the system control unit 14 of the order receiving server 1 refers to the stock DB 122, and acquires a product list including a product belonging to the store identified by the received store ID (step S108). Further, the system control unit 14 refers to the stock DB 122, and acquires product information indicating a product name, a sales price, a producer/manufacturer, a production place/manufacturing place and a standard of the product.

Next, the system control unit 14 generates a product list screen web page for displaying the product included in the product list (step S109), and transmits the product list screen web page to the user terminal 2 (step S110). In addition, the product list screen web page displays product information indicating at least a product name, a sales price, a producer/manufacturer, a production place/manufacturing place and a standard of a product.

When receiving the product list screen web page, the user terminal 2 makes the display display a product list screen (not illustrated) (step S111). When the product list screen is displayed, the user can register a product in a shopping cart by selecting the order quantity of a product which the user wishes to purchase and pressing (clicking) a shopping cart button. Further, after all products to order are registered in the shopping cart, it is possible to perform payment processing by pressing (clicking) the payment button. When detecting an operation of pressing (clicking) the payment button, the user terminal 2 transmits order data (an example of "order scheduled product information") indicating all products registered in the shopping cart and the order quantity of all products, to the order receiving server 1 (step S112). In addition, in this case, the system control unit (not illustrated) of the user terminal 2 functions as an example of an "order scheduled product transmitting means".

When receiving order data, the system control unit 14 of the order receiving server 1 performs grouping processing described below using FIGS. 8 to 13 (step S113). The grouping processing is directed to grouping an order product based on a group registered in the group DB 126. In addition, a product which cannot be grouped is referred to as a "non-group product".

Next, the system control unit 14 generates an order product screen web page (an example of "grouping result information") which displays content of the order product and a grouping processing result (step S114), and transmits the order product screen web page to the user terminal 2 (step S115).

When receiving the order product screen web page, the user terminal 2 makes the display display the order product screen (step S116). In addition, in this case, the system control unit (not illustrated) of the user terminal 2 functions as an example of a "grouping result receiving means".

Hereinafter, the order product screen will be described using FIG. 6. An order product screen 200 displays an order product list 210, a delivery day specifying area 220, a delivery time specifying combo box 230 and a next button 240.

The order product list 210 displays a list of products registered in the shopping cart when the payment button in the product list screen is pressed. The order product list 210 displays a product name, a standard, the quantity and the amount of money per product. Further, the order product list 210 displays the sum of products, a delivery fee and the sum. The total amount of money of all order products is displayed as the sum of products, and the total amount of the sum of products and the delivery fee is displayed as the sum.

In the order product list 210, to which group a product grouped by the grouping processing (step S113) is grouped is indicated by group numbers 211-1 to 221-$n$ ($n$ represents the number of grouped groups. $n$ is "4" in an example of FIG. 6). The example in FIG. 6 shows that "beef", "onion", "green pepper", "eggplant", "beer" and "coal" are grouped in a group 1. Meanwhile, a symbol X 212 indicates that a product (non-group product) which is not grouped by grouping processing (step S113) is a non-group product.

In the order product list 210, an order of all order scheduled products is canceled by stopping processing. Further, by pressing the cancel button 213 arranged in each product box, an order of the product is canceled. Furthermore, by arranging a cancel button 214 in each group box and pressing this button, an order of all products belonging to the group may be canceled.

In the delivery day specifying area 220, it is possible to specify a day to deliver ordered products. The delivery day specifying area 220 includes a year selection box 221, a month selection box 222 and a day selection box 223 to enable selection of the year, the month and the day of the delivery day. In addition, the selection boxes 221 to 223 work together such that they can prevent an inappropriate date from being selected as a delivery day.

The delivery time specifying combo box 230 allows a time zone for delivering an ordered product to be specified. The time zone which can be specified in the delivery time specifying combo box 230 is associated with a deliverable time registered in the store DB 122.

The next button 240 is a button which needs to be pressed (clicked) to proceed to subsequent processing. That is, the user who is an orderer can proceed to the subsequent processing by specifying a delivery date and time in the delivery day specifying area 220 and the delivery time specifying combo box 230 and then pressing (clicking) the next button 240.

When the display displays the above order product screen 200, the orderer can check how order products are grouped. Further, it is possible to specify the delivery date and time of the order products in the order product screen 200. Back to FIG. 5, when detecting an operation of pressing (clicking) the next button 240, the user terminal 2 transmits to the order receiving server 1 delivery date and time information indicating the date and time specified in the delivery day specifying area 220 and the delivery time specifying combo box 230 (step S117).

FIG. 7 is a sequence diagram illustrating a processing example of the order receiving system upon reception of an order. As illustrated in FIG. 7, when receiving delivery date and time information, the system control unit 14 of the order receiving server 1 generates a checkout screen web page for selection of a payment method (step S201), and transmits the checkout screen web page to the user terminal 2 (step S202).

When receiving the checkout screen web page, the user terminal 2 makes the display display a checkout screen (not illustrated) (step S203). When the checkout screen is displayed, the user checks a payment amount and selects a payment method. In the checkout screen, it is possible to select either payment by a credit card or payment by payment on delivery as a payment method. When the payment method is selected, the user terminal 2 transmits payment method information indicating a type of the selected payment method to the order receiving server 1 (step S204).

When receiving payment method information, the system control unit 14 of the order receiving server 1 generates an order reception record (step S205). The order reception record is a record which is registered in the order receiving DB 127, and is configured to include an order reception ID, a member ID, a store ID, a shipping destination name, a shipping destination address, a shipping destination telephone number, a specified delivery date and time, a total amount, a payment method and an order (1) {product ID, order quantity and group number}, . . . and order (n) {product ID, order quantity and group number}. The total amount is calculated based on a sales price of each order product (acquired from the stock DB 123 based on a product ID), and the order quantity. The group number is described as a group number indicating a group in which an order product is grouped by grouping processing. In addition, the group number is associated with an order of generation of groups. That is, a group number of a group for which grouping is performed firstly is "1", and a group number of a group for which grouping is performed secondly is "2".

Next, the system control unit 14 generates an order content check screen web page which displays order content (step S206), and transmits the order content check screen web page to the user terminal 2 (step S207).

When receiving the order content check screen web page, the user terminal 2 makes the display display the order content check screen (not illustrated) (step S208). The order content check screen displays order content (order product, quantity, total amount, specified delivery date and time and payment method), and a confirm button. The user presses (clicks) the confirm button if there is not error in the displayed order content. When the confirm button is pressed (clicked), the user terminal 2 transmits confirmation data indicating that the user has confirmed the order content to the order receiving server 1 (step S209).

When receiving confirmation data, the system control unit 14 of the order receiving server 1 registers an order reception record generated by processing in step S205, in the order receiving DB (step S210).

Figure 8:
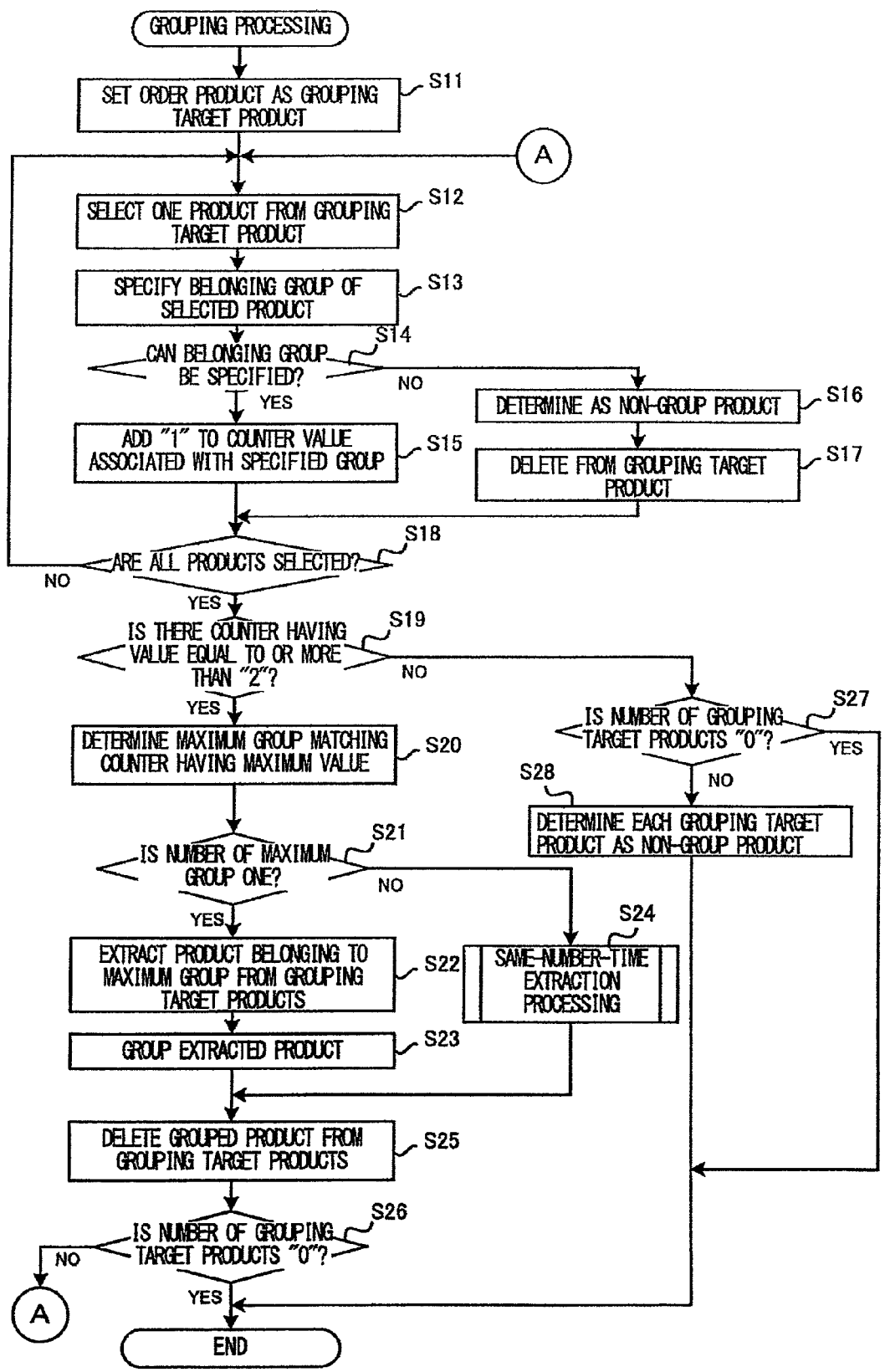
FIG. 8 is a flowchart illustrating an example of grouping processing in a system control unit of the order receiving server.
Figure 9:
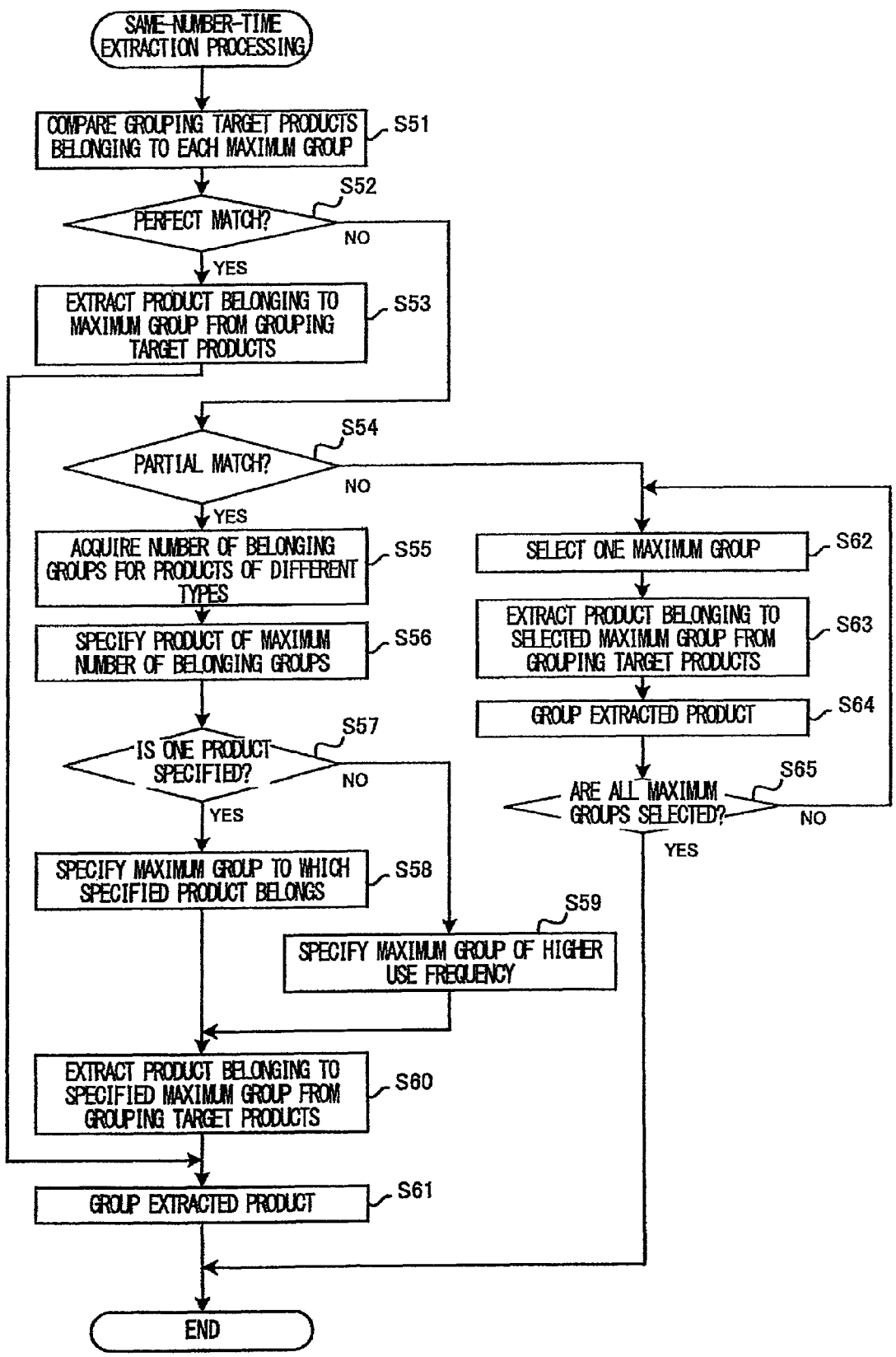
FIG. 9 is a flowchart illustrating an example of same-number-time extraction processing of the system control unit of the order receiving server.

Next, grouping processing will be described using FIGS. 8 and 9. FIG. 8 is a flowchart illustrating an example of grouping processing in the system control unit 14. FIG. 9 is a flowchart illustrating an example of same-number-time extraction processing of the system control unit 14.

As illustrated in FIG. 8, the system control unit 14 sets all order products indicated by order data as grouping target products (step S11).

Next, the system control unit 14 selects one product from the grouping target product (step S12). Next, the system control unit 14 specifies a group to which the selected product belongs (step S13). More specifically, the system control unit 14 refers to the product belonging group DB 125, and specifies a belonging group ID associated with a product ID of the selected product.

Next, the system control unit 14 decides whether or not the belonging group can be specified (step S14). When deciding that the belonging group can be specified (step S14: YES), the system control unit 14 adds "1" to a counter value associated with the specified group (step S15). When, for example, the specified group ID is a group ID for identifying the "night snack" group, "1" is added to a night snack counter value. In addition, when there is a plurality of specified group IDs, the system control unit 14 adds "1" to counter values associated with the respective specified group IDs. Further, each counter is initialized when processing in step S11 proceeds to processing in step S12 or when processing in step S26 proceeds to processing in step S12.

Meanwhile, when deciding that the belonging group cannot be specified (when a product ID of the selected product is not registered in the product belonging group DB 125) (step S14: NO), the system control unit 14 determines the selected product as a non-group product (step S16). Next, the system control unit 14 deletes the product selected from grouping target products (step S17).

When processing in step S15 or processing in step S17 is finished, the system control unit 14 decides whether or not all grouping target products are selected by processing in step S12 (step S18). When deciding that not all products are selected (step S18: NO), the system control unit 14 proceeds to processing in step S12. Meanwhile, when deciding that all products are selected (step S18: YES), the system control unit 14 then decides whether or not there is a counter having a value equal to or more than "2" (step S19).

When deciding that there is a counter having a value equal to or more than "2" (step S19: YES), the system control unit 14 determines a group associated with the counter having the maximum value as a maximum group (an example of "maximum product group") (step S20). Next, the system control unit 14 decides whether or not the number of groups determined as maximum groups is one (step S21).

When deciding that the number of groups determined as maximum groups is one (step S21: YES), the system control unit 14 extracts a product belonging to the maximum group from the grouping target products (step S22) and groups the extracted product (step S23). Meanwhile, when deciding that the number of maximum groups is not one (step S21: NO), the system control unit 14 performs same-number-time extraction processing (step S24).

Hereinafter, same-number-time extraction processing will be described using FIG. 9.

As illustrated in FIG. 9, the system control unit 14 compares grouping target products belonging to each maximum group (step S51). Next, the system control unit 14 decides whether or not all products (product IDs) match (step S52). When deciding that all products (product IDs) match (step S52: YES), the system control unit 14 extracts a product belonging to the maximum group from the grouping target products (step S53). Next, the system control unit 14 groups the extracted product (step S61), and finishes same-number-time extraction processing. Meanwhile, when deciding that not all products (product IDs) necessarily match (step S52: NO), the system control unit 14 then decides whether or not part of the products (product IDs) match (step S54).

When deciding that part of products (product IDs) match (step S54: YES), the system control unit 14 acquires the number of belonging groups for respective products of different types (product IDs) (step S55). More specifically, the system control unit 14 acquires the number of registered belonging group IDs by referring to the product belonging group DB 125 based on the product ID. Next, the system control unit 14 specifies a product which belongs to the maximum number of belonging groups (step S56). Further, the system control unit 14 decides whether or not the number of specified products is one (step S57).

When deciding that the number of specified products is one (step S57: YES), the system control unit 14 specifies a group to which the specified product belongs as the maximum group (step S58). Meanwhile, when deciding that the number of specified products is not one (step S57: NO), the system control unit 14 refers to the use frequency registered in the group DB 126, and specifies the maximum group of a higher use frequency among maximum groups to which the specified product belongs (step S59).

Next, the system control unit 14 extracts from grouping target products the product belonging to the maximum group specified by processing in step S58 or processing in step S59 (step S60). Next, the system control unit 14 groups the extracted product (step S61), and finishes same-number-time extraction processing.

Meanwhile, when deciding by processing in step S54 that even a part of products (product IDs) does not match (when all products (product IDs) are different (step S54: NO), the system control unit 14 selects one maximum group from a plurality of maximum groups determined in processing in step S20 (FIG. 8) (for example, a group to which a product for which the shopping cart button is pressed first belongs among products included a plurality of maximum groups) (step S62).

Next, the system control unit 14 extracts the product belonging to the selected maximum group from grouping target products (step S63), and groups the extracted product (step S64). Next, the system control unit 14 decides whether or not all maximum groups are selected by processing in step S62 (step S65). When deciding that all maximum groups are not selected (step S65: NO), the system control unit 14 proceeds to processing in step S62. Meanwhile, when deciding that all maximum groups are selected (step S65: YES), the system control unit 14 finishes same-number-time extraction processing.

Back to FIG. 8, the system control unit 14 deletes the product grouped by processing in step S23 or processing in step S24 from grouping target products (step S25). Next, the system control unit 14 decides whether or not the number of grouping target products is "0" (step S26). When deciding that the number of grouping target products is not "0" (step S26: NO), the system control unit 14 proceeds to processing in step S12. Meanwhile, when deciding that the number of grouping target products is "0" (step S26: YES), the system control unit 14 finishes grouping processing.

On the other hand, in processing in step S19, when deciding there is no counter having a value equal to or more than "2" (step S19: NO), the system control unit 14 then decides whether or not the number of grouping target products is "0" (step S27). When deciding that the number of grouping target products is not "0" (step S27: NO), the system control unit 14 determines the respective grouping target products as non-group products, and finishes grouping processing. Meanwhile, when deciding that the number of grouping target products is "0" (step S27: YES), the system control unit 14 finishes grouping processing.

In addition, when grouping a product by processing in step S26 illustrated in FIG. 8, and processing in step S61 and processing in step S64 illustrated in FIG. 9, the system control unit 14 associates the product to be grouped with a group number based on a grouping order.

Hereinafter, how a product is grouped in grouping processing will be described using examples illustrated in FIG. 4 and FIGS. 10 to 13. In addition, in the group DB 126, only the groups illustrated in FIG. 4 are registered, and only the products illustrated in FIG. 4 among products belonging to each group are registered. Hence, products (for example, "ballpoint pen") other than the products illustrated in FIG. 4 do not belong to any group. Meanwhile, order products illustrated in FIGS. 10 to 13 are all products included in order data transmitted by processing in step S112 (FIG. 5).

First, the system control unit 14 of the order receiving server 1 sets all order products illustrated in FIG. 10 as grouping target products 310 (step S11). Next, the system control unit 14 selects one product "beef" from the grouping target products 310 (step S12). Next, the system control unit 14 specifies a group to which "beef" belongs (step S13). As illustrated in FIG. 4, since "beef" belongs to the "sukiyaki" group and the "barbecue" group, the "sukiyaki" group and the "barbecue" group are specified. Next, although whether or not a group to which "beef" belongs can be specified is decided (step S14), the belonging group can be specified (step S14: YES), the system control unit 14 then adds "1" to a "sukiyaki" counter value and a "barbecue" counter value associated with the specified group (step S15). Subsequently, the system control unit 14 performs the same processing for the other grouping target products 310. However, the group to which the ballpoint pen belongs cannot be specified (see FIG. 4), and therefore the ballpoint pen is determined as a non-group product (step S16) and is deleted from the grouping target products 310 (step S17).

Thus, the system control unit 14 repeats processings in step S12 to step S18 for all grouping target products 310 illustrated in FIG. 10. Accordingly, the counter value associated with each group is a value indicated by a counter row 390 in FIG. 10. Next, the system control unit 14 decides whether or not there is a counter having a value equal to or more than "2" (step S19). In this case, there are counters having values equal to or more than "2" (step S19: YES), and the system control unit 14 then determines the "barbecue" group associated with a "barbecue" counter having the maximum value of "6" as a maximum group (step S20).

Next, the system control unit 14 decides whether or not the number of maximum groups is one (step S21). Meanwhile, only the "barbecue" group is the maximum group (step S21: YES), and the system control unit 14 then extracts "beef", "onion", "green pepper", "eggplant", "beer" and "coal" belonging to the "barbecue group" from the grouping target products 310 (step S22). Next, the system control unit 14 groups "beef", "onion", "green pepper", "eggplant", "beer" and "coal" (step S23). Next, the system control unit 14 deletes "beef", "onion", "green pepper", "eggplant", "beer" and "coal" from the grouping target products 310 (step S25).

When the system control unit 14 proceeds from processing in step S12 to processing in step S25 for the grouping target products 310 illustrated in FIG. 10, the grouping target products 310 are as illustrated in FIG. 11. In FIG. 11, grouped "beef", "onion", "green pepper", "eggplant", "beer" and "coal" are illustrated as processed products 320.

Further, "ballpoint pen" determined as a non-group product by processing in step S16 is illustrated as the processed product 320. In addition, for the grouped product group, a group number 321 indicating the grouping order is described in a group column 325. Further, for a product determined as a non-group product, a symbol X 329 indicating that the product is not grouped to any group is described in the group column 325.

Next, the system control unit 14 decides whether or not the number of the grouping target products 310 is "0" (step S26). As illustrated in FIG. 11, the number of the grouping target products 310 is not "0" (step S26: NO), and the system control unit 14 returns to processing in step S12, and repeats processing in step S12 to processing in step S18 for the grouping target products 310 illustrated in FIG. 11. Then, a counter value associated with each group is a value shown in the counter row 390 in FIG. 11.

Next, the system control unit 14 decides whether or not there is a counter having a value equal to or more than "2" (step S19). Meanwhile, there are counters having values equal to or more than "2" (step S19: YES), and the system control unit 14 determines the "simmered meat and potatoes" group and the "curry" group having the maximum counter values of "4" as maximum groups (step S20).

Next, the system control unit 14 decides whether or not the number of maximum groups is one (step S21). Meanwhile, the number of the maximum groups is two (the "simmered meat and potatoes" group and the "curry" group") (step S21: NO), and the system control unit 14 performs same-number-time extraction processing (step S24).

In same-number-time extraction processing illustrated in FIG. 9, the system control unit 14 first compares grouping target products belonging to the "simmered meat and potatoes" group and the "curry" group (step S51), and decides the grouping target products completely match (step S52). Meanwhile, although "pork", "potato" and "carrot" match, "shirataki" and "pickled shallot" are different. Hence, the system control unit 14 decides that a perfect match is not found (step S52: NO), and then decides whether or not a partial match is found (step S53). The system control unit 14 decides that a partial match is found (step S53: YES), and then acquires the number of belonging groups, respectively, for "shirataki" and "pickled shallot" (step S55). The system control unit 14 acquires "2" (the "sukiyaki" group and the "simmered meat and potatoes" group) as the number of belonging groups of "shirataki", and acquires "1" (only the "simmered meat and potatoes") as the number of belonging groups of "pickled shallot" (see FIG. 4).

Then, the system control unit 14 specifies "shirataki" having the maximum number of belonging groups of "2" (step S56), and further specifies the "simmered meat and potatoes" group to which specified "shirataki" belongs (step S58). Next, the system control unit 14 extracts "pork", "potato", "carrot" and "shirataki" belonging to the "simmered meat and potatoes" group, from the grouping target products 310 illustrated in FIG. 11 (step S60). Next, the system control unit 14 groups "pork", "potato", "carrot" and "shirataki" (step S61).

Back to FIG. 8, the system control unit 14 deletes "pork", "potato", "carrot" and "shirataki" from the grouping target products 310 illustrated in FIG. 11 (step S25).

Thus, when the system control unit 14 performs processing in step S12 to processing in step S25 for the grouping target products 310 illustrated in FIG. 11, the grouping target products 310 are as illustrated in FIG. 12. In FIG. 12, grouped "pork", "potato", "carrot" and "shirataki" are described as processed products 320.

Next, the system control unit 14 decides whether or not the number of the grouping target products 310 is "0" (step S26). As illustrated in FIG. 12, the number of grouping target products 310 is not "0" (step S26: NO), and the system control unit 14 returns to processing in step S12. Subsequently, similarly, the system control unit 14 repeats the above processing for the grouping target products 310 illustrated in FIG. 12. Then, "bread", "egg" and "yogurt" are grouped as the third group, and then "rice cracker" and "shampoo" are grouped as the fourth group.

When the system control unit 14 groups products up to the fourth group, only "pickled shallot" is left as a grouping target product. Then, the system control unit 14 decides that the number of grouping target products is not "0" in processing in step S26 (step S26: YES), and performs processing in step S12 to processing in step S18 for "pickled shallot". Next, the system control unit 14 decides "NO" both in processing in step S19 and processing in step S27, determines "pickled shallot" as a non-group product (step S28) and finishes grouping processing.

As illustrated in FIG. 13, after grouping processing is finished, order products are all processed products 320. Further, each order product is grouped in one of groups or is a non-group product.

[3.2. Operation Upon Transmission of Support Confirmation Mail]

Next, an operation of transmitting a support confirmation mail of inquiring an orderer what supporting method needs to be taken when a product is out of stock among order products which the user terminal 2 places an order to the order receiving server 1 will be described using a sequence diagram illustrated in FIG. 14.

First, the system control unit 14 of the order receiving server 1 acquires an order reception record from the order receiving DB 127 (step S301). More specifically, the system control unit 14 accesses the order receiving DB 127 on a regular basis, and acquires an order reception record with the specified delivery date and time set in a predetermined time zone (for example, a time zone with the specified delivery date and time set five hours after and eight hours before the current time). A predetermined time zone for acquiring the order reception record may be set by, for example, an operator of the order reception server 1 or store staff at random taking a delivery time into account.

Next, the system control unit 14 checks a stock of order products recorded in the order reception record (step S302). More specifically, the system control unit 14 searches in the stock DB 123 based on the store ID of the order reception record and the product ID of the order (1), decides whether or not the stock quantity is less than the order quantity of the order (1) and decides that the stock is in short (out of stock) when the stock quantity is a few. The system control unit 14 performs this processing of all ordered products of the order reception record (that is, the order (1) to the order (n)). When there are order products (out-of-stock products) having a stock quantity less than the order quantity, the system control unit 14 generates out-of-stock product information including a product ID of an out-of-stock product.

Next, the system control unit 14 checks whether or not there is out-of-stock product information, and, when there is no out-of-stock product information, proceeds to processing in step S308 described below. Meanwhile, when there is out-of-stock product information, the system control unit 14 then creates a support confirmation mail based on the out-of stock product information (step S303).

FIG. 15 is a view illustrating an example of a support confirmation mail. In a title 510 of the support confirmation mail, a title indicating that some products are out of stock among order products. In a body 520 of the support confirmation mail, a name 521 of a product (out-of-stock product) which is out of stock is displayed, and four proposals 522 to 525 are presented which are options to select a supporting method. In addition, although there is no stock corresponding to the order quantity but there are order products the stock quantity of which is not "0", a proposal of ordering of products corresponding to only the stock quantity may be presented.

The proposal 522 corresponds to a supporting method of canceling all of order products. The proposal 523 corresponds to a supporting method of canceling all products included in the same group as the out-of-stock product. In this case, the group refers to a group displayed on the order product screen 200 (FIG. 6) upon an order. With an example in FIG. 13, pork belonging to the group "2" (simmered meat and potato) is out of stock, and this means that a potato, a carrot and a shirataki are canceled all together. In addition, other order products included in the group may be listed in the body 520 of the support confirmation mail. Further, the proposal 523 is not presented when the out-of-stock product is a non-group product. The proposal 524 corresponds to a supporting method of canceling only out-of-stock products. The proposal 525 corresponds to a supporting method of ordering alternate products instead of the out-of-stock products.

When presenting the proposal 525, the system control unit 14 acquires an interchangeable product ID of the out-of-stock product from the interchangeable product DB 124, and checks a stock quantity of the interchangeable product in the stock DB 123. Further, when deciding that there is a stock corresponding to the order quantity of the out-of-stock product or more for the interchangeable product, the system control unit 14 selects the interchangeable product as an alternate product, and presents the alternate product in the proposal 525.

In addition, when a plurality of interchangeable product IDs are associated with the product ID of the out-of-stock product in the interchangeable product DB 124, the system control unit 14 checks stocks of the interchangeable products for each of the product. Further, when there are a plurality of types of an interchangeable product for which a stock corresponding to the order quantity is held, the system control unit 14 refers to a sales price of each interchangeable product in the stock DB 123, and selects as an alternate product a product having the price closest to the sales price of the out-of-stock product.

Figure 14:
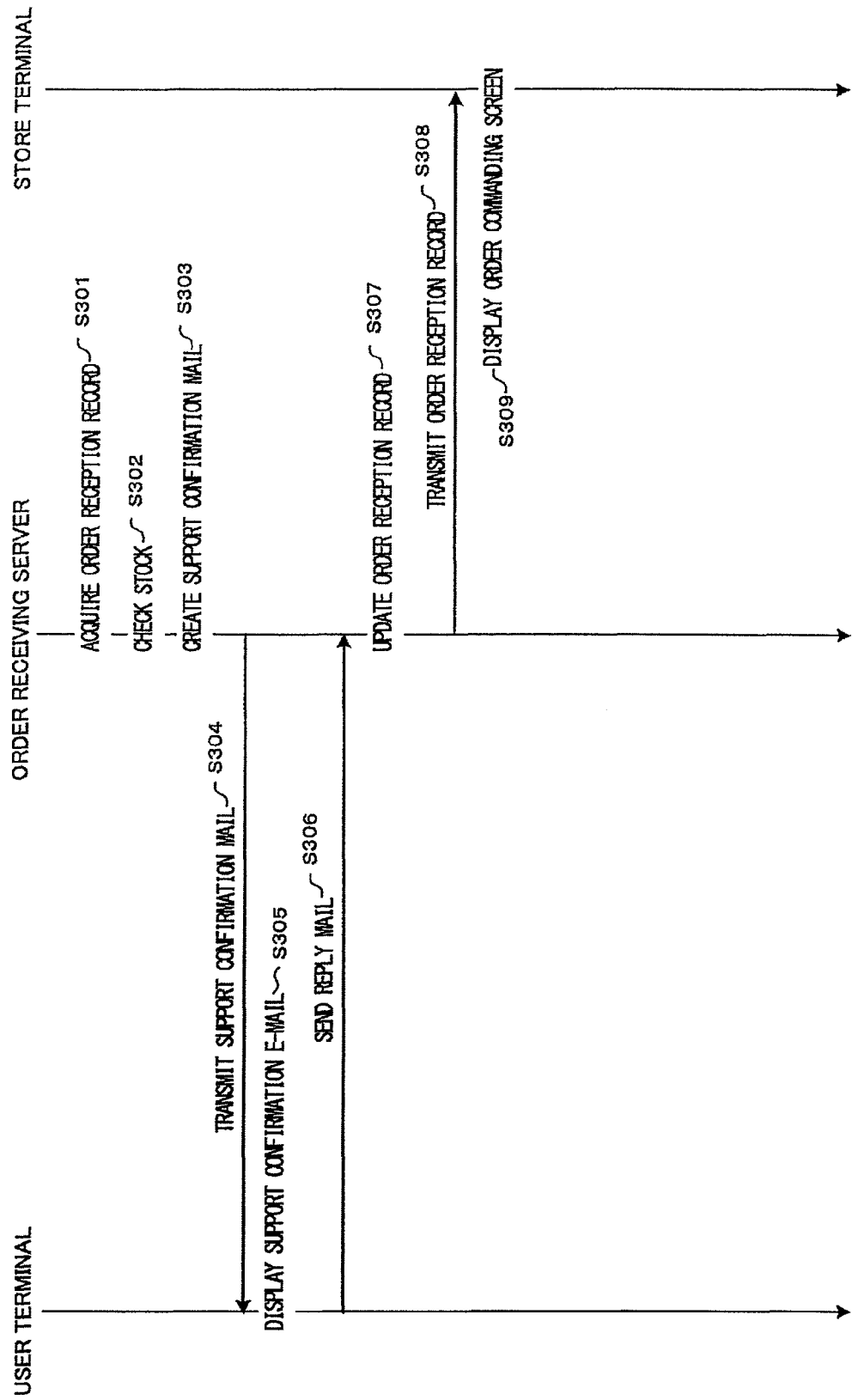

Back to FIG. 14, when the support confirmation mail is generated, the system control unit 14 transmits the support confirmation mail to an e-mail address registered in the member DB 121 (step S304). In addition, although FIG. 14 illustrates that the support confirmation mail is transmitted to the user terminal 2, the user terminal 2 which receives the support confirmation mail is not limited to a terminal used upon an order. Hereinafter, a terminal which receives a support confirmation mail will be described as the user terminal 2 for ease of description.

When receiving the support confirmation mail, the user terminal 2 makes the display display the support confirmation mail (step S305). In this case, the user sends a reply mail in which the user selects one of options presented in the body of the support confirmation mail. When detecting an operation of sending the reply mail, the user terminal 2 transmits the reply mail including information presenting the proposal selected by the user to the order receiving server 1 (step S306).

When receiving the reply mail, the system control unit 14 of the order receiving server 1 checks which proposal is selected, and updates the order reception record acquired by processing in step S301 according to the selected proposal (step S307).

More specifically, when the proposal 522 is selected, the system control unit 14 deletes the order reception record. When the payment method is credit card payment, the system control unit 14 performs processing of stopping charging the sum to a credit card company. In addition, when the proposal 522 is selected, processing after step S308 is not performed.

When the proposal 523 is selected, the system control unit 14 specifies a product for which the same number as a group number of the out-of-stock product is described as a group number, and deletes the order related to all specified products. In addition, the replay mail indicating that the proposal 523 is selected is an example of "cancellation information" of the present invention.

When the proposal 524 is selected, the system control unit 14 deletes the order of the out-of-stock product.

When the proposal 525 is selected, the system control unit 14 overwrites and updates the product ID of the out-of-stock product based on the product ID of the alternate product presented by the proposal 525 of the support confirmation mail.

Next, the system control unit 14 of the order receiving server 1 transmits the updated order reception record to the store terminal 3 installed at a store identified based on the store ID of the order reception record (step S308).

When receiving the order reception record from the order receiving server 1, the store terminal 3 records the order reception record in the storage unit. Store staff can check the order reception record recorded in the storage unit by a predetermined operation. When detecting this predetermined operation, the store terminal 3 displays on the display the order commanding screen based on the order reception record (step S309). The order commanding screen displays order content (a shipping destination name, a shipping destination address, a shipping destination telephone number, a specified delivery date and time, a total amount, a payment method, an order product and an order quantity of an order product). The store staff can make an arrangement of delivery of order products according to order content displayed on the order commanding screen.

As described above, the product belonging group DB 125 and the group DB 126 of the storage unit 12 of the order receiving server 1 according to the present embodiment stores a correspondence between a product group and a plurality of products belonging to the product group, and the system control unit 14 receives from the user terminal 2 order data indicating a plurality of order products which the user selects, groups a plurality of order products indicated by the received order data based on the product belonging group DB 125 and the group DB 126, and generates at least one or more groups. Further, the system control unit 14 transmits to the user terminal 2 the order product screen web page indicating to which group each grouped order product among a plurality of order products is grouped.

The order receiving server 1 according to the present embodiment groups a plurality of order products which the orderer wishes to purchase and, consequently, can process the order products in group units. Further, in the present embodiment, grouping is performed based on a group set according to a cooking recipe or a purpose for use (product belonging group DB 125 and group DB 126), so that it is possible to group products which are highly likely to be purchased together.

Further, in the product belonging group DB 125 and the group DB 126 according to the present embodiment, the correspondence between a plurality of groups and a plurality of products belonging to each group is registered, and the system control unit 14 of the order receiving server 1 repeats for order products which are not grouped (grouping target products) grouping processing (processing in step S12 to processing in step S26 in grouping processing) of comparing a plurality of products belonging to each of a plurality of groups registered in the group DB 126 and a plurality of order products indicated by the received order data, specifying a group to which a largest number of order products belong as a maximum group, and grouping an order product belonging to the specified maximum group among order products as one group.

The order receiving server 1 according to the present embodiment repeats grouping processing of grouping an order product based on a group to which a largest number of the order products belong. When the number of belonging products is large, this group is highly likely to be used. Consequently, it is possible to group order products which are predicted that the user is likely to wish to process together (for example, purchase or cancellation), that is, which is predicted to have high relevance.

Further, when there are a plurality of groups in which the number of belonging order products is the same and to which the maximum number of order scheduled products belong (step S21: NO), and when at least a part of order products belonging to each maximum group are different (step S54: YES), the system control unit 14 of the order receiving server 1 according to the present embodiment counts for each of the different products the number of groups to which the products belong among a plurality of groups registered in the group DB 126 (step S55), specifies the group to which the product of the maximum counted number belongs as the maximum group (step S56) and groups the order product belonging to the specified maximum group (step S61).

When there are a plurality of maximum groups to which a maximum number of order products belong and when at least part of order products belonging to each maximum group are different, the order receiving server 1 according to the present embodiment specifies a group to which a product belonging to a greater number of groups belongs as a maximum group, and groups the order product based on the specified maximum group. Consequently, it is possible to group a product which is more likely to be purchased in relation to other products.

Further, in the group DB 126 of the order receiving server 1 according to the present embodiment, a use frequency previously used to group an order product is registered for each group, and, in processing in step S56, when specifying a maximum group to which a product of the maximum counted number belongs, if there are a plurality of groups of the same counted number (step S57: NO), the system control unit 14 refers to the product group storing means, specifies a group of the highest use frequency as the maximum group among a plurality of groups (step S59) and groups the order product belonging to the specified maximum group (step S61).

The order receiving server 1 according to the present embodiment groups order products based on a group of a higher use frequency. Consequently, it is possible to realize groupings which are performed among order products predicted to have higher relevance, and which the user is predicted to be highly likely to desire.

Further, in the order receiving DB 127 of the order receiving server 1 according to the present embodiment, the system control unit 14 receives from the user terminal 2 information indicating which a group is to be canceled among groups presented on the order product screen web page.

The order receiving server 1 according to the present embodiment enables the orderer to cancel order products in group units.

Further, order products according to the present embodiment are provided at an internet supermarket site. In an internet supermarket site, various types of products such as fresh produce and convenient goods are handled, and therefore users frequently exhibit purchase behaviors matching a plurality of purposes when placing one order. That is, even if one order is placed, a plurality of purposes are satisfied in one order. Hence, it is required to group and independently handle a plurality of order scheduled products in one order. The order receiving server 1 according to the present embodiment can perform processing of, for example, making cancellation or ordering alternate products independently per group, so that it is possible to increase user's convenience.

In addition, a purpose upon ordering products is, for example, a cooking recipe (for example, sukiyaki or simmered meat and potatoes) or a purpose for use (for example, barbecue, breakfast or travel). Hence, pressing a cancel button once in group units is easier and provides higher convenience than canceling one by one all products belonging to a group associated with sukiyaki such as beef and Chinese cabbage when the user wants to have another food (for example, hamburger steak) other than sukiyaki at a point of time when the user who plans to order sukiyaki transmits order scheduled products to a server.

Further, when receiving order data (an example of "order scheduled product information") indicating order products and the order quantity of each order product, checking whether or not there is an out-of-stock product and confirming that there is an out-of-stock product, the system control unit 14 of the order receiving server 1 according to the present embodiment presents a name of the out-of-stock product (an example of "information for specifying an out-of-stock product") and at least one of (a) the proposal 524 of canceling only the out-of-stock product and (b) the proposal 525 of canceling the out-of-stock product and ordering an alternate product for the out-of-stock product, transmitting a support confirmation mail (an example of an "electronic mail") for encouraging selection of one of the proposals to the e-mail address of the orderer, and receiving a replay mail including information indicating which proposal of the presented proposals is selected. Hence, the system control unit 14 of the order receiving server 1 according to the present embodiment functions as an example of a receiving means, an out-of-stock checking means, a presented proposal transmitting means, a selection information acquiring means and an alternate product selecting means.

A conventional shopping site has a problem that, when there is no stock of an order product from an orderer, store staff at the shopping site make a call to the orderer to tell that the order includes a product which is out of stock, and need to check what kind of support needs to be provided. By contrast with this, the order receiving server 1 can easily check a supporting method which the user wishes to use when a product which is out of stock is included in products ordered by the user who is an orderer. That is, when there is a product which is out of stock among products ordered by the user, an electronic mail presenting a plurality of proposals as supporting methods are transmitted to the e-mail address of the user and information indicating the proposal selected by the user is further acquired. Consequently, even when there is a product which is out of stock among ordered products, it is possible to easily check on the server apparatus side a supporting method which the user wishes to use.

When there is an out-of-stock product among order products, the order receiving server 1 according to the present embodiment transmits a support confirmation mail which presents a supporting method as an option to an e-mail address of the orderer, and further acquires information which presents a proposal selected by the orderer. Consequently, even when there is an out-of-stock product among order products, the order receiving server 1 side such as the order receiving server 1 or store staff can easily check a supporting method which the orderer wishes to use.

Further, the system control unit 14 (an example of an "out-of-stock checking means") of the order receiving server 1 according to the present embodiment further receives delivery date and time information (an example of "specified date and time information") indicating a specified delivery date and time of order products, refers to the stock DB 123 in which a stock quantity indicating the number of stocks of order target products is registered at a predetermined time before the specified delivery date and time indicated by delivery date and time information, and checks whether or not there is an out-of-stock product.

The order receiving server 1 according to the present embodiment checks whether or not there is an out-of-stock product among order products a predetermined time before the specified delivery date and time and, when there is an out-of-stock product, transmits a support confirmation mail. The time a predetermined time before the specified delivery date and time can be determined taking a delivery situation of each store (further, each branch store) into consideration. Consequently, when, for example, products are delivered over the farthest distance during the busiest time at each store, the predetermined time may be determined. Alternatively, the predetermined time may be adequately changed depending on a season or a time at each store, for example. Thus, the support confirmation mail presenting the supporting method is transmitted to the user a predetermined time before the specified delivery date and time, so that the user can transmit to the order receiving server 1*a* desired supporting method before the products are actually delivered.

Further, the system control unit 14 of the order receiving server 1 according to the present embodiment refers to an interchangeable product DB 124 (an example of an "interchangeable relationship storing means") which associates and stores a product with a product interchangeable with the product and the stock DB 122 (an example of a "stock information storing means"), decides for an interchangeable product associated with the out-of-stock product whether or not there is a stock corresponding to the order quantity specified by order data, selects the interchangeable product as an alternate product when deciding that there is a stock corresponding to the order quantity, and presents the alternate product selected in the proposal 525 in the support confirmation mail.

Even when an order product is out of stock, the order receiving server 1 according to the present embodiment presents to the orderer as an alternate product a product which is interchangeable with an out-of-stock product and which is in stock. Consequently, when a product which the user who is an orderer orders is out of stock, it is possible to check an interchangeable product once before purchasing the product to order the alternate product.

Further, the system control unit 14 of the order receiving server 1 according to the present embodiment receives a store ID (an example of "order store information") indicating to which store of a plurality of stores an order of order products indicated by order data is placed, stores stock information in the stock DB 122 (an example of a "stock information storing means") per store, refers to the interchangeable product DB 124 (an example of an "interchangeable relationship storing means") which associates and stores products with products interchangeable with the products and the stock DB 122, decides for interchangeable products associated with the out-of-stock products at a store indicated by a store ID whether or not there is a stock corresponding to the order quantity specified by the order data, and, when deciding that there is a stock corresponding to the order quantity, selects the interchangeable products as alternate products. Further, the system control unit 14 presents the selected alternate products in a proposal of ordering alternate products of the out-of-stock products in the support confirmation mail.

The order receiving server 1 according to the present embodiment can present to an orderer as an alternate product a product which is handled at a store which has received an order, which is interchangeable with an out-of-stock product and which is in stock. Consequently, when a product which the user who is an orderer orders is out of stock, it is possible to check an interchangeable product once before purchasing the product to order the alternate product.

Further, the system control unit 14 of the order receiving server 1 according to the present embodiment refers to the interchangeable product DB 124 (an example of an "interchangeable relationship storing means"), acquires a product which is interchangeable with an out-of-stock product and decides for the acquired interchangeable product whether or not there is a stock corresponding to the order quantity.

The order receiving server 1 according to the present embodiment presents to the orderer as an alternate product a product registered in the interchangeable product DB 124 in advance as an alternate product.

Further, when there are a plurality of types of interchangeable products for which a stock corresponding to the order quantity is held, the system control unit 14 of the order receiving server 1 according to the present embodiment refers to a sales price (an example of "price information") of the stock DB 123 and selects as an alternate product a product of a type having the price closest to the price of the out-of-stock product.

The order receiving server 1 according to the present embodiment can present to an orderer as an alternate product a product which has a price close to an out-of-stock product and is easily acceptable for the orderer as an alternate product.

Further, with the system control unit 14 of the order receiving server 1 according to the present embodiment, the received order data includes a plurality of products as order products and also includes each order quantity of the plurality of order products. Furthermore, the system control unit 14 of the order receiving server 1 according to the present embodiment checks whether or not even one of a plurality of order products indicated by the received order data is out of stock, and further includes (c) the proposal 522 of canceling all of a plurality of order products in a support confirmation mail to be transmitted.

When a plurality of products are ordered, if a part of products are out of stock, the order receiving server 1 according to the present embodiment can present not only proposals 523 and 524 of canceling the out-of-stock products, but also the proposal 522 of canceling all of a plurality of order products.

Further, the order receiving server 1 according to the present embodiment receives order scheduled product information of products handled at an Internet supermarket, from the user.

In an internet supermarket site, various types of products such as fresh produce and convenient goods are handled, and therefore users frequently purchase a plurality of products at one order. Further, in this case, the user thinks in some cases that a purpose is realized when the user can receive all of the plurality of products on a preferred delivery day. The order receiving server 1 according to the present embodiment can check user's intension in the electronic mail and, consequently, can meet the user's needs more by hearing that.

That is, many users of an internet supermarket usually order a plurality of products for this one purpose assuming one purpose as an ultimate usage (for example, recipe). Hence, when, for example, there is pork which is out of stock for the user who plans to cook simmered meat and potato, there are several supporting methods depending on a user's situation as described below.

(1) The user cannot make simmered meat and potatoes without pork, and therefore eventually goes shopping at a supermarket. Hence, the user wants to cancel all order products. (Corresponding to the proposal 522)

(2) The user wants to make something other than simmered meat and potatoes, and therefore wants to cancel ingredients related to simmered meat and potatoes first. (Corresponding to the proposal 523)

(3) The user is going to purchase only pork at a butcher in the neighborhood, and wants all the ingredients of simmered meat and potatoes other than pork to be shipped. (Corresponding to the proposal 524)

(4) The user only needs to make simmered meat and potatoes using meat such as beef instead of pork, and the user wants an alternate product to be delivered. (Proposal 525) Thus, in case of an internet supermarket for which many orders are placed assuming use of products on a delivery day, it is preferable to check a user's intention in this case and handle an out-of-stock product.

4. Modified Example

4.1. How to Specify Maximum Group

As described above, in processing in step S57 of same-number-time extraction processing illustrated in FIG. 9, when deciding that the number of products specified by processing in step S56 is not one (step S57: NO), the system control unit 14 is configured to refer to the use frequency registered in the group DB 126, and specify the maximum group of a higher use frequency among maximum groups to which the specified product belongs (step S59). A modified example of this configuration will be described.

First, a group history DB (an example of a history information storing means) which manages a history of grouping processing which is performed for order products ordered by the user per user is provided in the storage unit 12. More specifically, in the group history DB 128 illustrated in FIG. 16A, a group ID of a group used for grouping processing and a date and time at which the group is used are registered per member ID. In addition, using a group serves as a base when a product is extracted in processing in step S22, processing in step S53, processing in step S60, or processing in step S63. For example, extracting "beef", "onion", "green pepper", "eggplant", "beer" and "coal" belonging to the "barbecue" group from the grouping target products 310 means that the "barbecue" group is used.

Further, when deciding that the number of products specified by processing in step S56 is not one (step S57: NO), the system control unit 14 refers to the group history DB 128 based on a member ID of an orderer. In this case, instead of processing in step S59, the system control unit 14 performs processing of specifying a group which is previously used to group order products of the orderer and which is used most recently among maximum groups to which each product specified by processing in step S56 belongs.

According to this modified example, order products selected by the orderer this time are grouped using a group which is previously used to group order products selected by the same orderer and which is used most recently. Consequently, it is possible to group in the same group a plurality of products which the orderer is highly likely to purchase together, that is, which is predicted to have high relevance. Accordingly, it is possible to, for example, catch up with a trend or catch with a season.

4.2. Selection of Alternate Product

Figure 16:
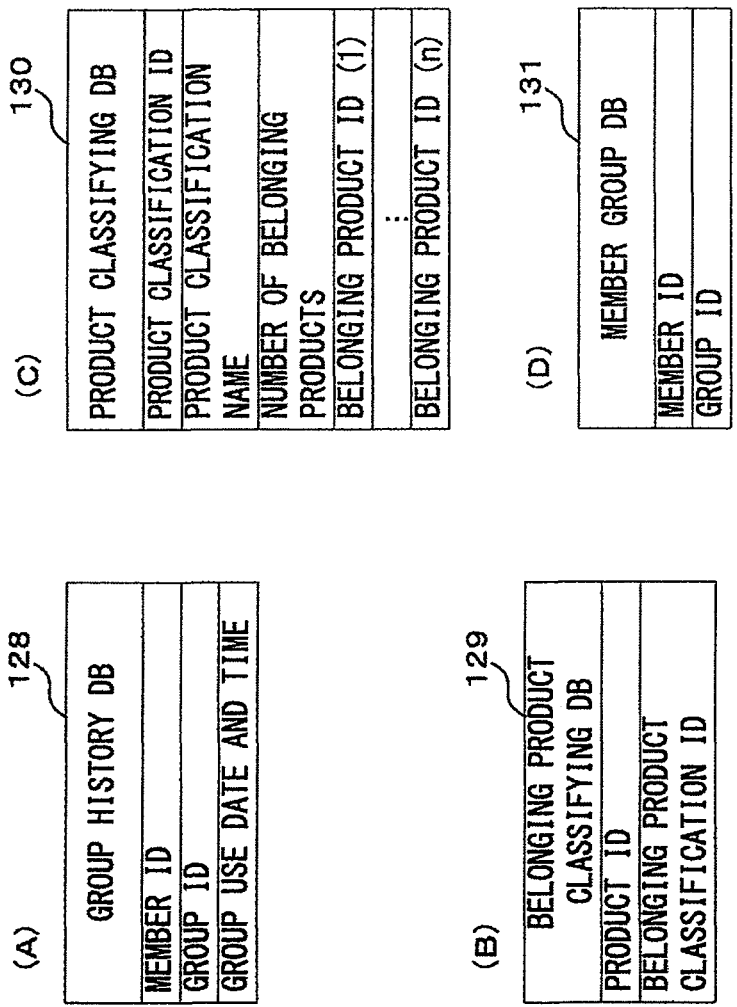
FIG. 16 is a view illustrating an example of content registered in a group history DB, a belonging product classifying DB, a product classifying DB and a member group DB.

The modified example of processing of selecting the alternate product referring to the interchangeable product DB 124 will be described using FIGS. 16B and C. FIG. 16B is a view illustrating an example of the belonging product classifying DB 129 which is referred instead of the interchangeable product DB 124. FIG. 16C is a view illustrating an example of the product classification DB 130.

In the belonging product classifying DB 129 illustrated in FIG. 16B, a product classification ID (referred to as "belonging product classification ID") of a product classification to which a product identified by a product ID belongs is registered per product ID. Meanwhile, the product classification ID is an identifier for identifying the product classification. For a product classification, a product classification set based on various criteria may be used. However, each classification is preferably configured with products which are mutually interchangeable. For example, meat including, for example, beef, chicken and pork can be one product classification. Further, beef including, for example, chuck eye roll, spencer roll and beef flank can also be one product classification.

In the product classifying DB 130 illustrated in FIG. 16C, a product classification name, the number of belonging products and a belonging product ID are registered per product classification ID. A product classification name is a name given to a product classification. The number of belonging products is the number of products included in a product classification. A belonging product ID is a product ID of a product included in a product classification. When a plurality of products are included in one product classification, a group ID of each product is registered as the belonging product ID (1), . . . and the belonging product ID(n).

According to this modified example, when there is an out-of-stock product, the system control unit 14 of the order receiving server 1 refers to the belonging product classifying DB 129 (an example of a "classification information storing means"), and acquires a product classification ID associated with a product ID of the out-of-stock product. Next, the system control unit 14 refers to the product classifying DB 130 based on the acquired product classification ID, and acquires a belonging product ID associated with the product classification ID (excluding the product ID of the out-of-stock product). The system control unit 14 regards the product associated with the acquired belonging product ID as a product which is interchangeable with the out-of-stock product. Next, the system control unit 14 refers to the stock DB 123, and checks whether there is a stock of the acquired interchangeable product. Further, when checking that there is a stock, the system control unit 14 regards the interchangeable product as an alternate product.

According to this modified example, it is possible to present an orderer as an alternate product a product which belongs to the same product classification as the out-of-stock product and is easily acceptable for the orderer as an alternate product.

4.3. Regarding Support Confirmation Mail

The modified example of the support confirmation mail will be described. First, beneficial information which provides benefit for the orderer may be provided in the support confirmation mail. More specifically, it is possible to provide discount information or campaign information of a product. By this means, it is possible to transmit beneficial information in the support confirmation mail for confirming a supporting method when there is an out-of-stock product to reduce the cost of distributing beneficial information.

As discount information of the product, for example, a bargain product can be introduced or a discount coupon number can be disclosed. The discount coupon number is a number used by the user to receive coupon discount service. The coupon discount service is a service which a user can get a discount when the user inputs a discount coupon number in a coupon number input area in the checkout screen upon purchase of a product. Thus, it is possible to encourage an orderer's motivation for purchase by providing discount information of a product to the orderer.

Further, a configuration is employed with the present embodiment where the proposals 522 to 525 are presented to the orderer as options in the support confirmation mail, and the user selects one of the proposals and returns the support confirmation mail. As the modified example instead of the present embodiment, a URL of a web page (referred to as a "supporting method selecting screen web page") which enables selection of a supporting method is described in the support confirmation mail. Further, a configuration may be employed where the orderer accesses the supporting method selecting screen web page, and selects a supporting method on the supporting method selecting screen.

Further, as the modified example of selection of an alternate product, an alternate proposal may be provided for the user in group units instead of product units. When, for example, pork is out of stock, if the user wants to make simmered meat and potatoes, it is possible to not only propose an alternate product of pork but also propose, for example, hamburger steak which is in stock instead of simmered meat and potatoes.

4.4. Regarding Checking of Stock

Figure 17:
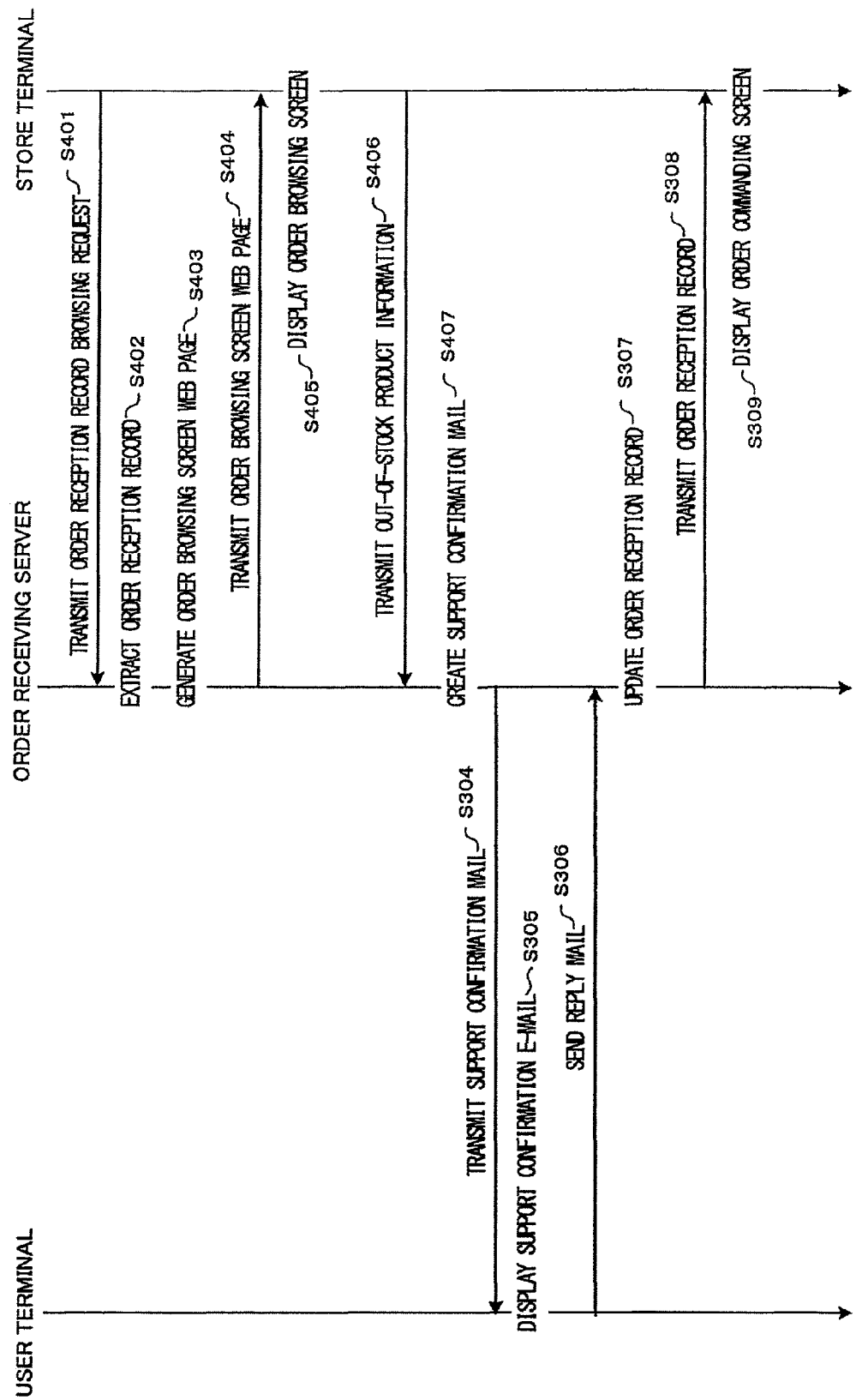

Next, the modified example of the a support confirmation mail transmitting operation of the order receiving server 1 described using FIG. 14 will be described using FIG. 17. In the example of FIG. 14, although the order receiving server 1 checks the stock of order products a predetermined time before a specified delivery date and time, in the modified example, store staff browse content of an order reception record registered in the order receiving DB 127, checks whether or not there are out-of-stock products among order products and transmits out-of-stock product information to the order receiving server 1 when there is an out-of-stock product.

First, when detecting store staff's operation of browsing order content, the store terminal 3 transmits an order reception record browsing request to the order receiving server 1 (step S401). In this case, the store terminal 3 also transmits a store ID of a store at which the store terminal 3 is installed.

Meanwhile, when receiving the order reception record browsing request and the store ID, the system control unit 14 of the order receiving server 1 searches in the order receiving DB 127 based on the received store ID, and extracts the order reception record with a specified delivery date and time set within a predetermined time from the current time (step S402). Next, the system control unit 14 generates an order browsing screen web page which displays order content of the extracted order reception record (step S403), and transmits the order browsing screen web page to the store terminal 3 (step S404).

When receiving the order browsing screen web page, the store terminal 3 displays the order browsing screen (not illustrated) (step S405). The order browsing screen displays order content (a shipping destination name, a shipping destination address, a shipping destination telephone number, a specified delivery date and time, a total amount, a payment method, an order product and an order quantity of an order product). Store staff check whether or not there is a stock of each order product corresponding to the order quantity on the order browsing screen. As a result of checking, when there is an order product which is out of stock (out-of-stock product), the store staff input an order reception ID and a product ID related to an out-of-stock product to the store terminal 3. When receiving an input of an order reception ID and a product ID, the store terminal 3 generates out-of-stock product information including information indicating that there is an out-of-stock product and indicating the order reception ID and the product ID, and transmits the out-of-stock product information to the order receiving server 1 (step S406).

When receiving the out-of-stock product information from the store terminal 3 and checking the content, the system control unit 14 of the order receiving server 1 generates a support confirmation mail similar to processing in step S303 (FIG. 14) (step S407). That is, in this modified example, the system control unit 14 of the order receiving server 1 functions as an example of an out-of-stock checking means. Hereinafter, although processing in step S304 to processing in step S309 are performed, these processings are the same as the processing in FIG. 14 and will not be described.

4.5. Product Group and Orderer

In the present embodiment, irrespective of an order product selected by any order (member), the system control unit 14 of the order receiving server 1 is configured to perform grouping based on groups registered in the product belonging group DB 125 and the group DB 126. As illustrated in FIG. 16D, a configuration may be employed with the modified example related to this configuration where a member group DB 131 which associates a member ID (member) with a group ID (group) is additionally provided in the storage unit 12 and, when an order product is grouped, grouping is performed based on a group associated with an orderer who selects the order product.

In the member group DB 131, a group ID to be associated with a member ID may be a group ID of a group registered in the group DB 126, or may be a group ID of a group created uniquely by a member. When a group ID of a group registered in the group DB 126 is associated with the member ID and is registered, a list of groups registered in the group DB 126 is presented on the group setting screen (not illustrated), and a user selects a group to be used to group an order product selected by the user.

Meanwhile, when a group ID of a group uniquely created by a member is associated with a member ID and is registered, user generated group information indicating the group generated by the member and a product belonging to this group is received from the user terminal 2. For example, the configuration of the order product screen (FIG. 6) is changed to a configuration where the system control unit 14 of the order receiving server 1 manually changes a group grouped by grouping processing (step S113), and transmits user generated group information related to the changed group to the order receiving server 1. When receiving the user generated group information, the system control unit 14 gives a new group ID to the generated group, and registers this group in the group DB 126. Further, the group ID which is additionally given and the member ID are associated and registered in the member group DB 131. Alternatively, in addition to FIG. 6, on the new group setting screen, a group and a product belonging to each group may be registered per user in the member group DB 131. The system control unit 14 functions as a group editing means that associates the correspondence between a product group indicated by the received user generated group information and a plurality of products belonging to the product group, with the member ID of the member who generates the product group, and stores the correspondence and the member ID in the group DB 126.

In grouping processing (FIG. 8) with the modified example, grouping is performed based only on a group associated with the group ID corresponding to the member ID of the orderer who selects an order product. For example, in processing in step S13, the system control unit 14 of the order receiving server 1 acquires from the member group DB 131 the group ID associated with the member ID of the orderer who selects the order product. Next, the system control unit 14 acquires groups associated with the acquired group ID from the group DB 126. Further, a group to which the product acquired in step S12 belongs is specified from the acquired groups. Thus, by performing grouping based only on the group associated with a member, it is possible to perform grouping matching behavioral characteristics of the member (for example, combination of desired products, life pattern or dietary pattern). Alternatively, in grouping processing (FIG. 8), a group associated with the user may be preferentially used referring to the member group DB 131.

In addition, with the modified example, it is possible to set whether or not the member wishes to perform grouping based on the group selected by the member or the group created by the member while the member logs in an internet supermarket site. Only when the setting indicates "wish", the system control unit 14 performs grouping based only on the group associated with the member.

4.6. Cancellation of Order Products in Group Units

With the present embodiment, an order product which can be canceled in group units after the orderer executes payment processing belongs to only a group including an out-of-stock product and presented in the support confirmation mail. In this regard, the orderer may voluntarily cancel order products in group units.

More specifically, when an operation of displaying a screen for canceling products is detected in a top page which is displayed when the orderer logs in an Internet supermarket site, a product canceling screen web page is transmitted from the order receiving server 1 to the user terminal 2. The user terminal 2 makes the display display the product canceling screen based on the received product cancel screen web page. In the product canceling screen, a list of products ordered by the orderer is displayed and products to be canceled can be selected in group units or product units. When the orderer selects a group or a product to be canceled, the user terminal 2 transmits cancellation information indicating which group or product is selected, to the order receiving server 1. The order receiving server 1 updates an order reception record registered in the order receiving DB 127 based on the received cancellation information. More specifically, a product included in the canceled group or a canceled product is deleted from the order reception record.

Further, with the present embodiment, although the system control unit 14 of the order receiving server 1 performs grouping processing of an order product as illustrated in FIGS. 8 and 9 (step S113), the user may group the order product.

4.7. Grouping Identical Product into Plurality of Groups

With the present embodiment, the system control unit 14 of the order receiving server 1 is configured such that once a product (for example, onion in FIG. 4) belonging to a plurality of groups is grouped in a maximum group (the group 1 (barbecue) in the example of FIG. 6), the product is not grouped in another group (for example, the group 2 (simmered meat and potatoes) with the example of FIG. 6). A configuration may be employed with the modified example related to this configuration where, as illustrated in FIG. 18, the onion grouped in the group 1 (barbecue) is grouped in the group 2 (simmered meat and potato), and the onion (that is, an overlapping product between a plurality of groups) is displayed according to a highlighting display mode (for example, a display mode of assigning a mark such as a black circle 250, a flashing display mode, a boldifying display mode or an italic type display mode) which allows the user to easily recognize the onion. In addition, with the example of FIG. 18, although the highlight display mode is applied to the onion belonging to the group 2, the highlight display mode may also be applied to the onion belonging to the group 1.

Figure 19:
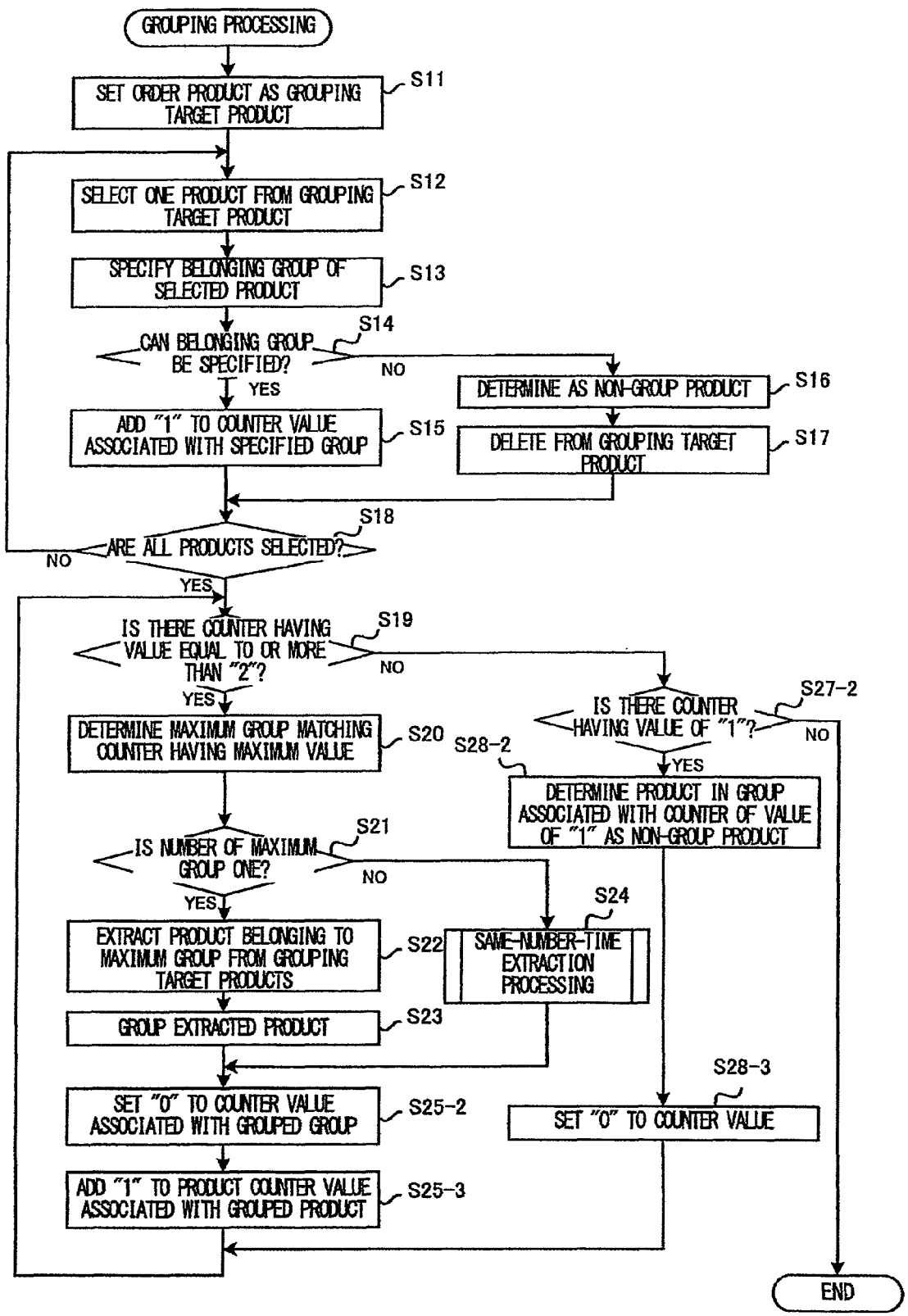
FIG. 19 is a flowchart illustrating an example of grouping processing in a system control unit of the order receiving server.

Grouping processing of the system control unit 14 employing this configuration will be described using FIG. 19. Hereinafter, differences from the grouping processing illustrated in FIG. 8 will be mainly described. In addition, in FIG. 19, a counter in processings in step S15, step S19, step S20, step S25-2, step S27-2, step S28-2 and step S28-3 is referred to as a group counter, and is distinguished from a product counter in processing in step S25-3.

First, the processings from step S11 to step S24 are as described above, and will not be described. When finishing the processing in step S23 or the processing in step S24, the system control unit 14 then sets "0" to a group counter value associated with the group in which the product is grouped by processing in step in step S23, step S61 (see FIG. 9) or step S64 (see FIG. 9) (step S25-2). This is processing for not performing grouping again for the group which is grouped once (that is, in FIG. 19, the group associated with the group counter having a value equal to or more than "2" is a grouping target).

Next, the system control unit 14 adds "1" to a product counter value associated with each grouped product (step S25-3). For example, when the onion is grouped, "1" is added to an onion counter. The system control unit 14 proceeds to step S19 after finishing processing in step S25-3.

Meanwhile, when deciding that there is no group counter having a value equal to or more than "2" in processing in step S19 (step S19: NO), the system control unit 14 then decides whether or not there is a group counter having a value of "1" (step S27-2). In this case, when deciding that there is no group counter having a value of "1" (step S27-2: NO), the system control unit 14 finishes processing of the flowchart. Meanwhile, when deciding that there is a group counter having a value of "1" (step S27-2: YES), the system control unit 14 determines a product belonging to a group associated with the group counter having value of "1" as a non-group product (step S28-2), and sets "0" to the group counter value (step S28-3). The system control unit 14 proceeds to step S19 after finishing processing in step S28-3.

Further, when generating the order product screen web page in processing in step S114 in FIG. 5, the system control unit 14 generates an order product screen web page to display products having a product counter value equal to or more than "2" in a highlight display mode.

Thus, when there is a product belonging to a plurality of groups, it is possible to provide, for example, the following effects (i) to (iii) by grouping and displaying the product in all groups.

(i) When there is a product of order scheduled products belonging to a plurality of product groups, an orderer can check all over to which product group the product belongs.

(ii) For example, when "eggplant" is out of stock with the example illustrated in FIG. 18, it is possible to meet a demand of the orderer that, although the orderer wants to cancel the group 1, the orderer wants to leave the group 2 as is and purchase a onion as one product of the group 2. That is, the orderer can purchase the onion as one product of the group 2 as long as the orderer does not obviously cancel the onion. More specifically speaking, even if because "eggplant" is out of stock, the orderer cancels the group 1 by pressing the cancel button 214, the orderer can purchase the onion as one product of the group 2 as long as the user does not press the cancel button 213 associated with "onion".

(iii) Further, if a support confirmation mail as illustrated in FIG. 20 as an example is transmitted to an orderer, when "onion" is out of stock with an example where products illustrated in the order product list 210 of FIG. 18 are selected (an example where an onion, beef, a green pepper, an eggplant, beer, coal, pork, a potato, a carrot and shirataki are selected as order scheduled products), the orderer can recognize that the orderer wants to cancel not only the group 1 but also the group 2.

Hereinafter, a support confirmation mail illustrated in FIG. 20 will be described. In addition, FIG. 20 is a view illustrating an example of a support confirmation mail when the orderer selects the products illustrated in order product list 210 in FIG. 18 and when an onion is out of stock. The title 510, the body 520 and the proposals 522, 524 and 525 of the support confirmation mail are as described above, and will not be described. A proposal 523-1 corresponds to a supporting method of canceling all products of the group 1 which includes the out-of-stock product (onion). Further, in the row next to the proposal 523-1, products (beef, a green pepper, an eggplant, beer and coal) other than an out-of-stock product (onion) included in the group 1 may be listed. Similarly, a proposal 523-2 corresponds to a supporting method of canceling all products of the group 2 which includes an out-of-stock product (onion). Further, in the row next to the proposal 523-2, products (pork, a potato, a carrot and shirataki) other than an out-of-stock product (onion) included in the group 2 are listed.

Meanwhile, although log-in processing is performed shortly after accessing an internet supermarket site and displaying a top page (not illustrated) of the internet supermarket site with the embodiment, the log-in processing is not limited to this timing. For example, when order data indicating all products registered in a shopping cart and the order quantity of all products is transmitted to the order receiving server 1, log-in processing may be performed. In this case, when the user then accesses an internet supermarket site from the terminal apparatus, using Cookie information which is generated when the user previously accesses the order receiving server 1 from a terminal apparatus and is stored in the terminal apparatus, a list of stores or branch stores including a user's shipping destination address in a deliverable area may be acquired.

In addition, the present invention is by no means limited to the embodiment. The embodiment is an exemplary embodiment, employs substantially the same configuration as a technical idea cited in the claims of the present invention, and includes all devices in the claims as long as the devices provide the same function and effect. Consequently, for example, products for which the server apparatus according to the present invention receives an order are by no means limited to products handled at an Internet supermarket, and may be other products. More specifically, those products may be products handled at, for example, a mail order site which handles books, CDs, DVDs or the like.

For example, a case will be described where a whole collection of a book that comes in multiple volumes is ordered, at the same time, a plurality of other irrelevant books are ordered. In this case, canceling processing is facilitated by grouping the book that comes in multiple volumes into one group. If possible canceling processings include canceling all remaining volumes when, for example, middle volumes are out of stock or canceling all series of the book that comes in multiple volumes because it is found that the order exceeds a budget when the total amount of all order products is calculated, it is possible to avoid complicated cancellation of the books one by one.

Alternatively, when, for example, CDs are purchased and the total amount exceeds a budget, if the CDs are grouped per artist or the like, it is possible to cancel the CDs from a group of an artist of the lowest interest in group units. As a result, it is possible to prevent complicated cancellation processing.

Further, a order scheduled product is not limited to a product which is scheduled to be ordered for a purpose of purchase, and includes, for example, a product which is scheduled to be ordered for a purpose of rental or a product which a user is scheduled and asked to order for a purpose of manufacturing, delivery or the like.

Further, although, with the present embodiment, various DBs (for example, the product belonging group DB 125 and the group DB 126 which are examples of the "product group storing means", the stock DB 122 which is an example of the "stock information storing means", and the interchangeable product DB 124 which is an example of the "interchangeable relationship storing means") are constructed in the storage unit 12 of the order receiving server 1, instead of this configuration, a configuration may be employed where databases are constructed in a storage unit (for example, a storage unit of apparatus which the order receiving server 1 can access) other than in the order receiving server 1, and the order receiving server 1 adequately accesses.

Further, FIG. 21 illustrates a screen example of an order product screen 200A where cancellation cannot be made in group units.

Further, the order receiving server 1 may function as an order receiving apparatus that has: an order receiving means (system control unit 14) that receives order information indicating an order product ordered by a user and an order quantity of the order product; an out-of-stock checking means (system control unit 14) that checks that the order product indicated by order information received from the order receiving means is out of stock; a transmitting means (system control unit 14) that, when the out-of-stock product checking means checks that the order product is out of stock, transmits to an e-mail address of the user an electronic mail indicating information for specifying the out-of-stock product and at least one of proposals of (a) canceling an order of the out-of-stock product and (b) canceling the order of the out-of-stock product and ordering an alternate product for the out-of-stock product; and a selection information acquiring means (system control unit 14) that acquires information indicating which one of presented proposals is selected.

In this case, the order receiving means may further receive specified date and time information indicating a specified delivery date and time of the order product indicated by order information, and the out-of-stock checking means may refer to the stock information storing means that records stock information indicating the number of stocks of products a predetermined time before the specified delivery date and time indicated by the specified date and time information, and checks whether or not there is a product for which a stock corresponding to the order quantity is not held among order products indicated by the received order information to check that the order product indicated by the order information is out of stock.

In this case, the order receiving apparatus may further have: an interchangeable relationship storing means that associates and stores a product with a product interchangeable with the product; and an alternate product selecting means that refers to the stock information storing means, decides for an interchangeable product associated with an out-of-stock product whether or not there is a stock corresponding to the order quantity specified by order information and, when there is the stock corresponding to the order quantity, selects the interchangeable product as an alternate product, and the transmitting means may present the alternate product selected by the alternate product selecting means in a proposal of (b) ordering the alternate product of the out-of-stock product.

In this case, the order transmitting means may receive order store information indicating to which store of a plurality of stores the order product indicated by order information is ordered, the stock information storing means further may have: an interchangeable relationship storing means that stores stock information per store, and associates and stores a product with a product interchangeable with the product; and an alternate product selecting means that refers to the stock information storing means, decides for an interchangeable product associated with an out-of-stock product at a store indicated by order store information whether or not there is a stock corresponding to the order quantity specified by order information and, when there is the stock corresponding to the order quantity, selects the interchangeable product as an alternate product, and the transmitting means may present the alternate product selected by the alternate product selecting means in a proposal of (b) ordering the alternate product of the out-of-stock product.

In this case, the order receiving apparatus may further have a classification information storing means that stores classification information indicating a product classification of a product per product, and the alternate product selecting means may refer to classification information, acquire a product belonging to the same product classification as an out-of-stock product as an interchangeable product, and decide for the acquired interchangeable product whether or not there is a stock corresponding to the order quantity.

In this case, the stock information storing means may further store price information indicating a price of a product per product, and when there are a plurality of types of interchangeable products for which a stock corresponding to the order quantity is held, the alternate product selecting means may refer to price information to select a product of a type having the price closest to the price of the out-of-stock product as an alternate product.

In this case, order information received by the order receiving means may include a plurality of products as order products and also include the order quantity of each of the plurality of order products, the out-of-stock checking means may check that there is even one out-of-stock product among a plurality of order products indicated by the order information received by the order receiving means, and an electronic mail transmitted by the transmitting means may further include a proposal of (c) canceling all of a plurality of order products.

In this case, the out-of-stock checking means may check that there are two or more out-of-stock products among a plurality of order products indicated by the order information received by the order receiving means, and a proposal of (a) canceling an order of an out-of-stock product, in an electronic mail transmitted by the transmitting means may present cancellation of a plurality of products which the out-of-stock checking means determines as out-of-stock products.

In this case, the order receiving apparatus may further have: a product grouping storing means that stores a correspondence between a product group and a plurality of products belonging to this product group; and a grouping means that groups a plurality of order products indicated by order information received by the order receiving means, based on a product group stored in the product group storing means, and generates at least one or more groups, and when the out-of-stock checking means checks that the order product is out of stock and the transmitting means may specify to which group generated by the grouping means the out-of-stock product is included, and present information for specifying a group including the out-of-stock product and a proposal of canceling all order products belonging to the group including the out-of-stock product in an electronic mail.

In this case, the electronic mail may include beneficial information which is beneficial for the orderer.

In this case, the beneficial information may be discount information of the product.

The order receiving method may include: a step of, at an order computer which receives order information of products handled at an internet supermarket from the user, receiving order information indicating an order product ordered by the user and the order quantity of the order product; a step of, at the computer, checking that the order product indicated by the received order information is out of stock; a step of, at the computer, when checking that the order product is out of stock, transmitting to an e-mail address of the user an electronic mail indicating information for specifying an out-of-stock product and at least one of proposals of (a) canceling an order of the out-of-stock product and (b) canceling the order of the out-of-stock product and ordering an alternate product for the out-of-stock product; and a step of, at the computer, acquiring information indicating which proposal of the presented proposals is selected.

In this case, an order receiving program causes a computer to function as: an order receiving means that receives order information indicating an order product ordered by a user and an order quantity of the order product; a out-of-stock checking means that checks that the order product indicated by the order information received by the order receiving means is out of stock; a transmitting means that, when the out-of-stock product checking means checks that the order product is out of stock, transmits to an e-mail address of the user an electronic mail indicating information for specifying the out-of-stock product and at least one of proposals of (a) canceling an order of the out-of-stock product and (b) canceling the order of the out-of-stock product and ordering an alternate product for the out-of-stock product; and a selection information acquiring means that acquires information indicating which proposal of the presented proposals is selected.

EXPLANATION OF REFERENCE NUMERALS

1 ORDER RECEIVING SERVER
11 COMMUNICATION UNIT
12 STORAGE UNIT
121 MEMBER DATABASE
122 STORE DATABASE
123 STOCK DATABASE
124 INTERCHANGEABLE PRODUCT DATABASE
125 PRODUCT BELONGING GROUP DATABASE
126 GROUP DATABASE
127 ORDER RECEIVING DATABASE
13 INPUT/OUTPUT INTERFACE UNIT
14 SYSTEM CONTROL UNIT
15 SYSTEM BUS
2 USER TERMINAL
3 STORE TERMINAL
NW NETWORK
S ORDER RECEIVING SYSTEM

The invention claimed is:

1. A server apparatus, including at least one processor, which is connected with a terminal apparatus through a network, the server apparatus comprising:
at least one memory operable to store program code;
at least one processor operable to access said memory and read said program code and operate, as instructed by said program code, to:
receive, from the terminal apparatus, order scheduled product information indicating a plurality of order scheduled products selected by a user one by one;
in response to receiving the order scheduled product information, group the plurality of order scheduled products selected by the user and indicated by the received order scheduled product information, based on product group information indicating a correspondence between a product group and a plurality of products belonging to the product group, and generate at least one or more groups of products that are to be delivered together; and transmit, to the terminal apparatus, a web page comprising grouping result information, the grouping result information indicating to which group each order scheduled product from among the plurality of order scheduled products indicated by the received order scheduled product information is grouped, the web page further comprising an item provided per each group, wherein the item, when selected by the user, commands processing, as a group, on two or more order scheduled products that belong to a corresponding group of the item.

2. The server apparatus according to claim 1, wherein the at least one processor operable to access said memory and read said program code and operate, as instructed by said program code, to:

store a product group per user, and associate and store a product group with user identification information for identifying a user, receive user identification information of a user who selects the plurality of order scheduled products indicated by the order scheduled product information, from the terminal apparatus, and group the plurality of order scheduled products indicated by the received order scheduled product information, based on a product group associated with user identification information of a user who selects the order scheduled products.

3. The server apparatus according to claim 2, wherein the at least one processor operable to access said memory and read said program code and operate, as instructed by said program code, to:

receive, from the terminal apparatus, user generated group information indicating a product group generated when a user groups the plurality of order scheduled products indicated by received order scheduled product information, and associate and store in the product group a correspondence between the product group indicated by the user generated group information and a plurality of products belonging to the product group with user identification information of the user who generates the product group.

4. The server apparatus according to claim 1, wherein the at least one processor operable to access said memory and read said program code and operate, as instructed by said program code, to:

store a correspondence between a plurality of product groups and a plurality of products belonging to each product group, and repeat, for order scheduled products which are not grouped, grouping processing of comparing a plurality of products belonging to each of a plurality of product groups stored in the product group and a plurality of order scheduled products indicated by the received order scheduled product information, specifying as a maximum product group a product group to which a maximum number of order scheduled products belong, and grouping as one group a product belonging to the maximum product group specified among the order scheduled products.

5. The server apparatus according to claim 1, wherein the at least one processor operable to access said memory and read said program code and operate, as instructed by said program code, to:

store a correspondence between a plurality of product groups and a plurality of products belonging to each product group, and group an order scheduled product per product group by comparing a plurality of products belonging to each of a plurality of product groups and a plurality of order scheduled products indicated by the received order scheduled product information, and group an order scheduled product belonging to a plurality of product groups into all product groups to which the order scheduled product belongs.

6. The server apparatus according to claim 4, wherein the at least one processor operable to access said memory and read said program code and operate, as instructed by said program code, to:

when there are a plurality of product groups which comprise a same number of belonging order scheduled products and to which a maximum number of order scheduled products belong, and at least part of order scheduled products belonging to each of the plurality of product groups are different, count a number of belonging product groups for each of the different products by referring to the product group, and specify as the maximum product group a product group to which the counted maximum number of products belong.

7. The server apparatus according to claim 6, wherein the at least one processor operable to access said memory and read said program code and operate, as instructed by said program code, to:

store a use frequency of each product group used when an order scheduled product is previously grouped, and when specifying the product group to which the counted maximum number of products belong, if there are a plurality of product groups of the same counted number, cause at least one of said at least one processor to specify a product group of a highest use frequency among the plurality of product groups as the maximum product group.

8. The server apparatus according to claim 6, wherein the at least one processor operable to access said memory and read said program code and operate, as instructed by said program code, to:

associate and store a history of a product groups used to group an order scheduled product, with user identification information of a user, wherein, when specifying the product group to which the counted maximum number of products belong, if there are a plurality of product groups of the same counted number; and based on user identification information of a user who selects the order scheduled product indicated by the order scheduled product information, specify as the maximum product group a product group, among the plurality of product groups, which is used to group an order scheduled product that the user has selected previously and which is used most recently.

9. The server apparatus according to claim 1, wherein the at least one processor operable to access said memory and read said program code and operate, as instructed by said program code, to:

receive, from the terminal apparatus, cancellation information indicating a group to be cancelled among a group indicated by the grouping result information.

10. The server apparatus according to claim 1, wherein a product selected by the user as the order scheduled product is handled at an internet supermarket.

11. The server apparatus according to claim 1, wherein the order scheduled product information further includes information indicating an order quantity of each of the order scheduled product, and
wherein the at least one processor operable to access said memory and read said program code and operate, as instructed by said program code, to:
check that an order scheduled product indicated by the order scheduled product information is out of stock;
when the order scheduled product is out of stock, transmit to an electronic mail address of a user an electronic mail presenting information for specifying an out-of-stock product and at least one of the proposals of (a) canceling an order of an out-of-stock product and (b) canceling an order of an out-of-stock product and ordering an alternate product for the out-of-stock product; and
acquire information indicating which one of the presented proposal is selected.

12. The server apparatus according to claim 11, wherein the at least one processor operable to access said memory and read said program code and operate, as instructed by said program code, to:
receive specified date and time information indicating a specified delivery date and time of the order scheduled product indicated by the order scheduled product information, and
record stock information indicating a number of stocks of products a predetermined time before the specified delivery date and time indicated by the specified date and time information, check whether or not there are products for which stocks corresponding to an order quantity are held among the order scheduled product indicated by the received order scheduled product information, and check that the order scheduled product indicated by the order scheduled product information is out of stock.

13. The server apparatus according to claim 12, wherein the at least one processor operable to access said memory and read said program code and operate, as instructed by said program code, to:
associate and store a product with a product interchangeable with the product; and
judge for a product associated and interchangeable with the out-of-stock product whether or not there is a stock corresponding to an order quantity specified by the order scheduled product information, and select the interchangeable product as the alternate product when deciding that there is a stock corresponding to an order quantity, and
present the alternate product in a proposal of (b) ordering an alternate product for an out-of-stock product.

14. The server apparatus according to claim 12,
wherein the at least one processor operable to access said memory and read said program code and operate, as instructed by said program code, to:
associate and stores a product with a product interchangeable with the product; and
judge for an interchangeable product associated with the out-of-stock product at the store indicated by the order store information whether or not there is a stock of a product corresponding to an order quantity specified by the order scheduled product information, and select the interchangeable product as the alternate product when deciding that there is a stock corresponding to an order quantity;

present the alternate product in a proposal of (b) ordering an alternate product for an out-of-stock product,
receive order store information indicating to which store of a plurality of stores an order of the order scheduled product indicated by the order scheduled product information is placed, and
store the stock information per store.

15. The server apparatus according to claim 13, wherein the at least one processor operable to access said memory and read said program code and operate, as instructed by said program code, to:
refer to classification information indicating a product classification of a product per each product, acquire as an interchangeable product a product which belongs to a same product classification as the out-of-stock product and determine for the acquired interchangeable product whether or not there is a stock corresponding to an order quantity.

16. The server apparatus according to claim 13, wherein the at least one processor operable to access said memory and read said program code and operate, as instructed by said program code, to:
store price information indicating a price of a product per product, and
when there are a plurality of types of interchangeable products for which stocks corresponding to order quantities are held, refer to the price information and select as the alternate product a product of a type having a price closest to the price of the out-of-stock product.

17. The server apparatus according to claim 11, wherein the at least one processor operable to access said memory and read said program code and operate, as instructed by said program code, to:
check whether or not even one of the plurality of order scheduled products indicated by the order scheduled product information is out of stock, and
wherein the electronic mail further includes a proposal of (c) canceling all of the plurality of order scheduled products.

18. The server apparatus according to claim 17, wherein the at least one processor operable to access said memory and read said program code and operate, as instructed by said program code, to:
check whether or not there are two or more out-of-stock products among the plurality of order scheduled products indicated by the order scheduled product information, and
wherein the electronic mail further includes a cancellation the plurality of products which are confirmed as out-of-stock products.

19. The server apparatus according to claim 11, wherein the electronic mail includes beneficial information which is beneficial to the orderer.

20. The server apparatus according to claim 19, wherein the beneficial information is discount information of a product.

21. A product grouping method, performed by at least one processor, comprising:
receiving, using at least one of said at least one processor, at a computer, from a terminal apparatus order scheduled product information indicating a plurality of order scheduled products selected by a user one by one;
in response to receiving the order scheduled product information, grouping, using at least one of said at least one processor, the plurality of order scheduled products selected by the user and indicated by the received order scheduled product information at the computer based on a correspondence between a product group and a plurality of products belonging to the product group, and generating at least one or more groups of products that are to be delivered together; and transmitting, using at least one of said at least one processor, at the computer, to the terminal apparatus a web page comprising grouping result information, the grouping result information indicating to which group each grouped order scheduled product among the plurality of order scheduled products indicated by the received order scheduled product information is grouped, the web page further comprising an item provided per each group, wherein the item, when selected by the user, commands processing, as a group, on two or more order scheduled products that belong to a corresponding group of the item.

22. A non-transitory recording medium with a computer-readable product grouping program recorded thereon which causes a computer to:

receive, from a terminal apparatus, order scheduled product information indicating a plurality of order scheduled products selected by a user one by one;

in response to receiving the order scheduled product information, group the plurality of order scheduled products selected by the user and indicated by the received order scheduled product information, based on a correspondence between a product group and a plurality of products belonging to the product group, and generates at least one or more groups of products that are to be delivered together; and transmit, to the terminal apparatus, a web page comprising grouping result information, the grouping result information indicating to which group each grouped order scheduled product among the plurality of order scheduled products indicated by the received order scheduled product information is grouped, the web page further comprising an item provided per each group, wherein the item, when selected by the user, commands processing, as a group, on two or more order scheduled products that belong to a corresponding group of the item.

23. A product grouping system comprising:

at least one memory operable to store program code;

a terminal apparatus;

a server apparatus which is connected with the terminal apparatus through a network; and wherein the server apparatus comprises at least one processor operable to access said memory and read said program code and operate as instructed by said program code to:

receive, from the terminal apparatus, order scheduled product information indicating a plurality of order scheduled products selected by a user one by one;

in response to receiving the order scheduled product information, group the plurality of order scheduled products selected by the user and indicated by the received order scheduled product information, based on product group information indicating a correspondence between a product group and a plurality of products belonging to the product group, and generate at least one or more groups of products that are to be delivered together; and transmit, to the terminal apparatus, a web page comprising grouping result information, the grouping result information indicating to which group each order scheduled product among the plurality of order scheduled products indicated by the received order scheduled product information is grouped, the web page further comprising an item provided per each group, wherein the item, when selected by the user, commands processing, as a group, on two or more order scheduled products that belong to a corresponding group of the item, and wherein the terminal apparatus comprises at least one processor operable to access said memory and read said program code and operate as instructed by said program code to:

transmit the order scheduled product information to the server apparatus; and receive the grouping result information from the server apparatus.

24. The server apparatus according to claim 1, wherein the product group information is registered in advance of selecting the plurality of order scheduled products by the user.

* * * * *